United States Patent
Marcos et al.

(10) Patent No.: US 6,347,342 B1
(45) Date of Patent: *Feb. 12, 2002

(54) METHOD AND APPARATUS FOR DYNAMICALLY BROKERING OBJECT MESSAGES AMONG OBJECT MODELS

(75) Inventors: Paul Marcos, Los Altos; Kresten Krab Thorup, Menlo Park, both of CA (US)

(73) Assignee: NeXT Software, Inc., Redwood City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,146

(22) Filed: Jul. 15, 1996

(51) Int. Cl.[7] ................................................ G06F 9/54
(52) U.S. Cl. ........................ 709/315; 709/313; 709/310
(58) Field of Search ...................... 395/680; 709/303, 709/305, 315, 100, 310, 311, 312, 313, 314

(56) References Cited

U.S. PATENT DOCUMENTS

| | | | |
|---|---|---|---|
| 3,276,316 A | | 10/1966 | Makas |
| 5,329,619 A | * | 7/1994 | Page et al. ................... 395/200 |
| 5,423,432 A | | 6/1995 | Krutak et al. |
| 5,481,721 A | * | 1/1996 | Serlet et al. ................ 709/303 |
| 5,502,304 A | | 3/1996 | Berson et al. |
| 5,511,197 A | * | 4/1996 | Hiu et al. .................... 395/680 |
| 5,532,104 A | | 7/1996 | Goto |
| 5,732,270 A | * | 3/1998 | Foody et al. ................ 709/303 |
| 5,872,973 A | * | 2/1999 | Mitchell et al. ............ 709/305 |

FOREIGN PATENT DOCUMENTS

| | | |
|---|---|---|
| EP | 0297927 | 1/1989 |
| GB | 2189800 | 11/1987 |

OTHER PUBLICATIONS

Orfali et al, "The server side of CORBA", OS/2 developer Jul./Aug. 1995 pp. 1–5.*
OMG, "Universal Networked Objects", 1995.*
John Rymer,, "distributed object interoperability", Distributed computing monitor, v10, n3, p3(26) 1995.*
John Rymer, "OMG's UNO", Distributed computing monitor v9, n12, p32(8), 12/94.*
OMG, Understanding the ORB, Part 2, 1995 pp 73–90.*
IONA Technologies, The Orbix Architecture 1995 pp 1–23.*
Abstract of Japanese Patent Appln. No. 54093647, published on 02/23/8, in Publication No. 156019009.
Abstract of Japanese Patent Appln. No. 59107158, published on Dec. 11, 1985, in Publication No. 60250304.
Abstract of Japanese Patent Appln. No. 58066713, published on Nov. 1, 1984, Publication No. 59192938.

* cited by examiner

Primary Examiner—Majid A. Banankhah
(74) Attorney, Agent, or Firm—The Hecker Law Group

(57) ABSTRACT

The present invention dynamically brokers object messages between object models. An mediating component provides a bridge between object models such that messages can be transmitted in either direction between object models. The mediating component can be resident on a client machine, a server machine, or both. The mediating component can be used as a bridge between two instances of the same object model running on different machines. Thus, network communication is made possible for objects of an object model that otherwise lacks a networking capability. The mediating component maps a client object to a server object through proxy objects and stub objects. The proxy object always responds affirmatively when queried by a client object whether a server object can execute a particular method. A client object's message is forwarded to a server object. The mediating component performs any necessary translation of arguments or format of the message. In addition, the mediating component translates a server object's response.

19 Claims, 19 Drawing Sheets

METHOD AND APPARATUS FOR DYNAMICALLY BROKERING OBJECT MESSAGES AMONG OBJECT MODELS

BACKGROUND OF THE INVENTION

1. Field of the Invention

This invention relates to dynamic brokering of messages between objects implemented using like or different object models.

2. Background

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation." In object-oriented programming, operations that can be performed on the data are referred to as "methods."

An object-oriented software application uses objects to define its data and the methods that operate on the data. An object communicates with another object via messages. For example, when one object needs to manipulate data that resides in another object or needs to execute computation methods in another object, it sends a message. The requesting object identifies the desired manipulation operation by specifying a method. The requesting object can further send arguments that can be used by the second object in performing the named method. The servicing object performs the method requested in the message. The data provided by the requesting object can be used to perform the requesting operation. In client/server terminology, the requesting object is called the client object and the servicing object is called the server object.

When the client and server objects are running in the same computer and operating system or in the same process or memory address space, the program or system can use its own mechanisms for messaging and object identification without regard for any other systems. The physical location of the objects is determined, known, and maintained by the single system. In a distributed environment, however, objects can reside on different systems and across networks, for example. Thus, in a distributed environment, a client object may need the services of a server object that resides on a remote system. Not all object models provide for such remote requests. Also, the remote system may use an object messaging mechanism that is incompatible with the client object's messaging mechanism. In that case, the client object and server object cannot communicate or "interoperate."

An object model provides a mechanism for communication, or messaging, between objects within the model. The mechanism includes a protocol that defines the method of communication. Examples of object models include the NeXT object model, Microsoft's Object Linking and Embedding/Common Object Model (OLE/COM), Sun-Soft's Distributed Object Environment (DOE), and Smalltalk. To facilitate communication, an object model can use an object bus, or an Object Request Broker (ORB). An ORB allows objects to make requests of, and receive responses from, other objects. Examples of ORBs include CORBA (defined by Object Management Group), SOM from IBM, ORB Plus from HP, ObjectBroker from Digital Equipment Corporation, and Orbix from Iona.

An ORB uses an Interface Definition Language (IDL) to define static interfaces between objects. For example, an interface defines the methods and properties, or arguments, for each object. An interface file written in IDL is compiled to generate client and server language-specific stubs such as C, C++, Objective-C, etc. These stubs must be compiled into both the client and the server before any communication can take place.

These language-specific stubs define how clients invoke corresponding services on the servers. From a client's perspective, the stub acts like a local call. The stub is a local proxy for the remote server object. The stub includes code to encode and decode an operation and its parameters into a compacted message format that can be sent to the server. This is referred to as marshaling. Several ORBs, including the CORBA ORB, are described in detail in R. Orfali et al., "The Essential Distributed Objects Survival Guide" (New York: John Wiley & Sons, 1996).

In addition to the language-specific stubs, CORBA provides some application program interfaces (APIs) on the client-side to facilitate object communication. A Dynamic Invocation Interface provides APIs that can be used to look up the metadata that defines the server interface, generate message parameters, issue a remote call, and receive results from the call. An Interface Repository is a run-time database that contains machine-readable versions of the IDL-defined interfaces. The APIs associated with the Interface Repository provide mechanisms for retrieving, storing and updating the metadata information contained in the Interface Repository. The ORB Interface includes APIs to convert an object reference (i.e., a unique name or identifier associated with an object) to a string.

Like the client side, the server side includes IDL stubs, or server stubs. A server stub is also referred to as a skeleton. Like a client stub, a server stub is defined using IDL and created using an IDL compiler. A server stub provides a static interface to a service provided, or exported, by a server. It calls the method on the server identified by the client. On the server side, CORBA provides functionality to aid in servicing a request.

A Dynamic Skeleton Interface provides a run-time binding mechanism to handle incoming method calls directed to a server that does not have a server stub. An object adapter provides the run-time environment for instantiating a server object, assigning an object reference to a server object, and passing it a request. An Implementation Repository is a run-time repository that identifies the classes a server supports, the objects that are instantiated, and the instantiated objects' object references. Administrative data such as trace information can also be stored in the Implementation Repository. The server side includes an ORB Interface that is the same as that used on the client side.

Existing object models such as the ones identified above do not provide a means for dynamic communication across object models. Thus, an OLE object cannot automatically and dynamically communicate with an object in the DOE object model. When a programmer is preparing an application program that must communicate across object models, the programmer must identify the destination objects to the ORB by declaring and defining them in an IDL method file. The IDL method file is then compiled in conjunction with run-time libraries of each object model, producing separate executable files for the client and server. This process must be repeated when a method or property of an object changes or when the application program is modified to reference new objects in a foreign or incompatible object model, for example. Thus, the ORBs only provide a static means for communicating across object models. The ORB is not capable of dynamically passing a message from one object model to an incompatible object model without prior knowledge of the method.

In OLE Automation, a subset of the OLE/COM object model from Microsoft Corporation (MS), a set of object definitions (or ODL) is compiled to create a type library or repository of object descriptions (e.g., objects and their methods and properties). Before invoking a method in an object, an OLE/Automation client object queries the library, to determine whether a server object can process the desired method. To do this, the object invokes the GetIDsOfNames method on the server object to determine whether the desired method is a valid method of the server object.

The GetIDsOfNames method converts text names of properties and methods into a corresponding set of dispatch identifiers (dispIDs). A dispID uniquely identifies a method or argument. It is assigned to a method or argument in an object description file that is compiled before run-time. Thus, if a method or property is added, a new dispID must be generated and compiled into the server.

If the response from the GetIDsOfNames method returns a dispID for the desired method, the client object invokes the method on the server object using the dispID to identify the method. If it is not a valid method, the client object must handle the error. If the method exists, but an error is raised during processing, the client object must handle a different error. This is awkward because it requires the application programmer to write code to handle at least two types of error messages.

Further, this process requires the client object to send two messages. When the client and server objects do not reside on the same machine, the messages must be sent across a network between the client and server objects to invoke a single method. This increases the network's message load, which is undesirable.

SUMMARY OF THE INVENTION

The present invention dynamically brokers object messages between objects implemented using object models. A mediating component provides a bridge between objects in these object models such that messages can be transmitted in either direction between object models. The mediating component can be resident on a client machine, a server machine, or both, depending on the type of communication being done. The mediating component can be used as a bridge between two instances of the same object model running on different machines. Thus, a networked version is created for an object model that otherwise lacks a networking capability.

The mediating component intercepts messages sent by a client object to the server object. That is, messages sent by a client object are sent to the server object via the mediating component. However, the client believes that the messages are being sent directly to the server object. The mediating component creates a mapping between a client object and a server object. Mapping information is determined by the mediating component when a client object requests a connection to the server object.

When a client requests a connection to a server object, the mediating component determines whether the server object is available on the server machine. If the server object is available, the mediating component returns a proxy (e.g., returns pointer to or identifier for the proxy object) for the server object to the client object. If the proxy object does not already exist, the mediating component creates the proxy object.

If the stub object associated with the server object does not exist, it is created by the mediating component. The mediating component creates a mapping between the proxy object returned to the client object, the server object's stub object and the server object. The mapping information can be stored in one or more tables, for example. A table look up mechanism can be used to retrieve the mapping information.

The mapping information can be used to satisfy a future connection request. When a connection request is made for a server object, the mediating component queries the mapping information to determine whether a mapping already exists for the requested server object. If a mapping does exist, the identity of the proxy object is returned to the client object.

The client object uses the connection to send a message to the server object. A client object's message is forwarded to a server object via the proxy and stub objects. The mediating component performs any necessary message translation. In addition, the mediating component translates a server object's response.

The client object's message is generated using the message protocol of the client object's object model. The client object's message is translated into the message protocol of the server object's object model. For example, the proxy object determines the expected method identification and the number and type of arguments for the server object.

The proxy object builds a method invocation for the server object using the client object's message and the information expected by the server object. For example, the proxy object translates a method identification in the client object's message to one expected by the server object. In addition, the proxy object can translate the arguments such that the types of arguments provided in the client object's message are the same as the expected types. For example, a string argument can be translated into an object argument.

A translated message is forwarded to the server object on the server machine via the proxy and stub objects mapped to the server object by the mediating component. The proxy object forwards the translated message to the stub object. The stub object forwards the translated message to the server object. The server object processes the message. A response is forwarded to the proxy object via the stub object. The proxy object translates the response message using the client object's message protocol. In addition, the proxy object can translate the response such that the response type is that expected by the client object. The message is forwarded to the client object.

The mediating component delays the creation of a server machine stack until it is determined that a method is callable on the server machine. A message is forwarded to the server object via a plurality of intervening objects such as the proxy and stub objects on the server machine. The invention waits until the message is received by the last intervening object (e.g., the server object's stub object) before the message is unraveled. Otherwise, each intervening object would retrieve the method and arguments from the message, push the arguments on a stack, attempt to invoke the method, fault, rebuild the message, and forward the message to another object. The invention optimizes the message transmission by eliminating the need to unravel the message at each intervening point.

The mediating component can be resident on the client, server, or both. The mediating component can act as a bridge between compatible or incompatible object models.

DETAILED DESCRIPTION OF THE INVENTION

A method and apparatus for dynamically brokering object messages among object models is described. In the following description, numerous specific details are set forth to provide a more thorough description of the present invention. It will be apparent, however, to one skilled in the art, that the present invention may be practiced without these specific details. In other instances, well-known features have not been described in detail so as not to obscure the invention.

Figure 1:
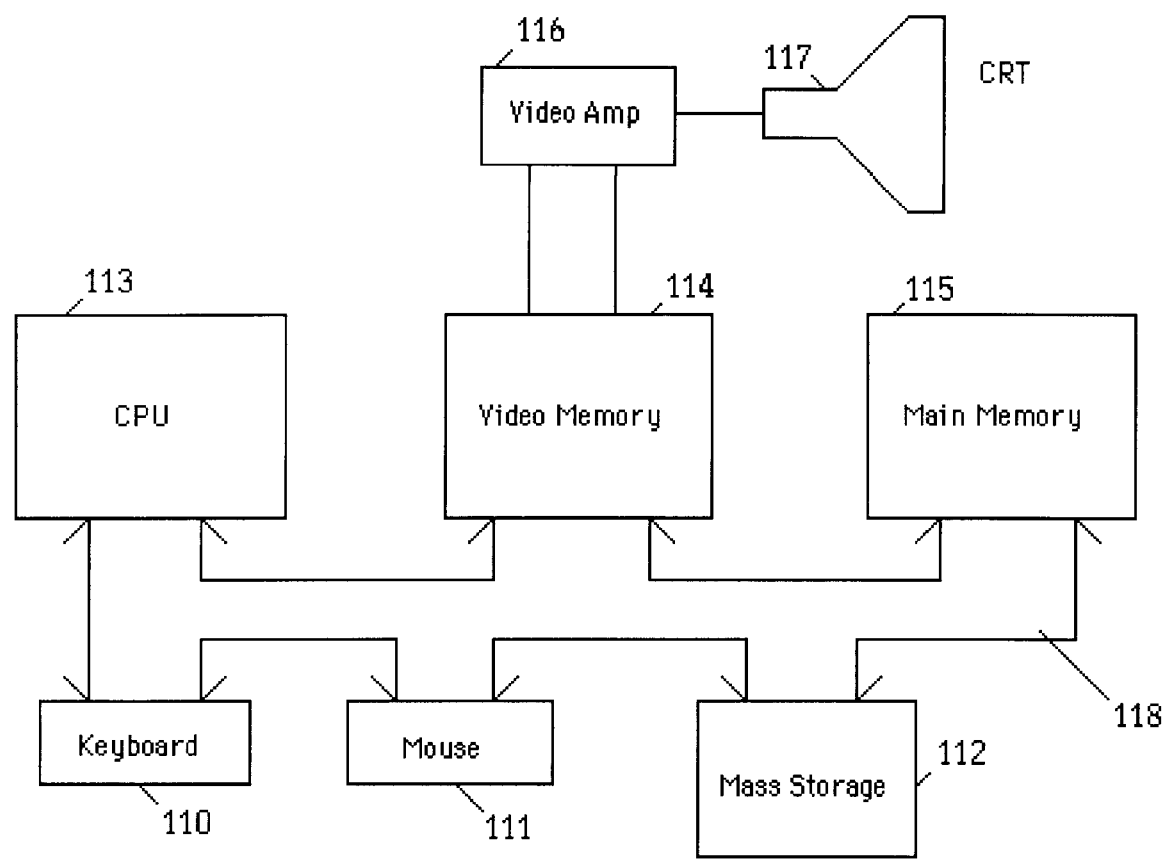
FIG. 1 provides an example of a general purpose computer to be used in accordance with embodiments of the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used in place of separate DATA and address lines.

In the preferred embodiment of this invention, the CPU 113 is a 32-bit microprocessor manufactured by Motorola, such as the 680X0 or PowerPC processor or a microprocessor manufactured by Intel, such as the 80X86 or Pentium processor. However, any other suitable microprocessor or microcomputer may be utilized. Main memory 115 is comprised of dynamic random access memory (DRAM). About 32 megabytes of DRAM preferred. Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is configured to dynamically broker object messages among object models.

Figure 2:
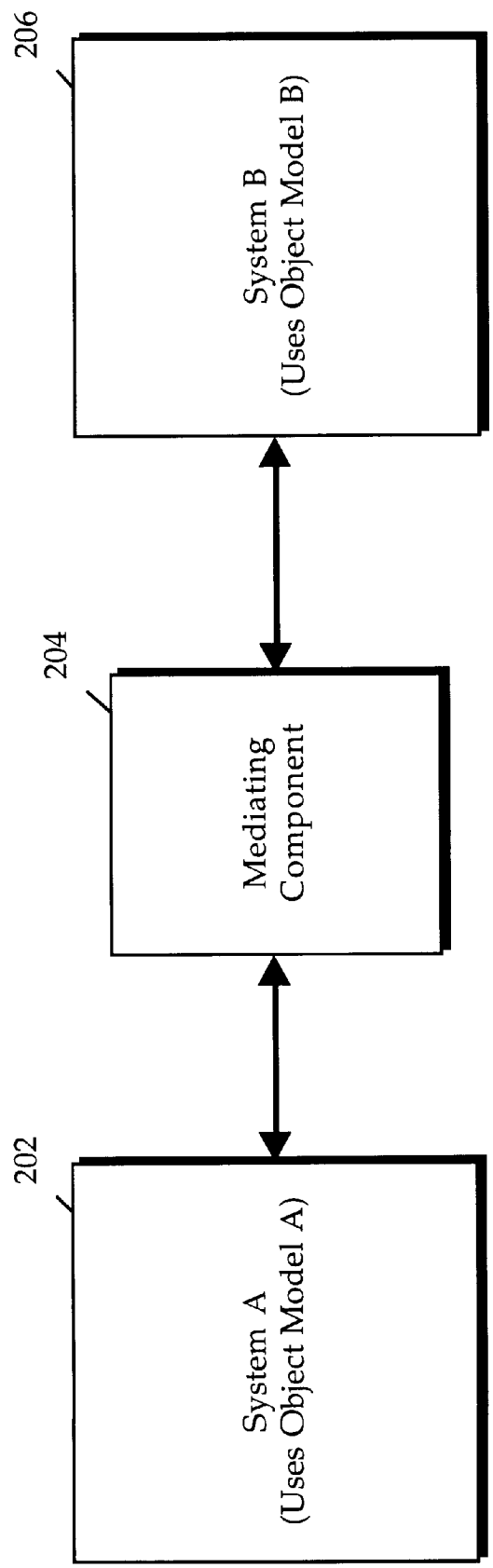
FIG. 2 provides a block diagram giving an overview of embodiments of the present invention.

FIG. 2 provides a block diagram overview of an embodiment of the present invention. Mediating component 204 provides a bridge between objects implemented using object models. For example, mediating component 204 provides a bridge between system A 202 (which uses object model A) and system B 206 (which uses object model B).

Systems A and B (202 and 206, respectively) provide a platform in which object models A and B operate. Systems A and B each may be a machine, process, client, or server. System A 202 can include operating system software such as the NEXTSTEP, or OPENSTEP framework that executes in the Mach operating system. System B is the Windows environment running in the DOS operating system, for example.

Object model A can be a different object model than object model B. For example, object model A may be NeXT Software, Inc.'s Distributed Object (DO) model and object model B may be Microsoft, Inc.'s Object Linking and Embedding/Component Object Model (OLE/COM).

Alternatively, object model A can be the same object model as object model B. In this case, mediating component 204 can act as a bridge in a network environment such that an object in an object model can be distributed across different machines. That is, the bridging capability of the present invention can be used to create a network version of an object model. The present invention can be used to allow a server object residing in OLE/COM on a first machine to service a message generated by a client object that resides in OLE/COM on a second machine.

Mediating component 204 provides a dynamic bridge between objects implemented using object models. Using the present invention, there is no need to define a static interface between objects and their object models. Mediating component 204 brokers a message by determining the interface requirements as each request arises during runtime. Thus, there is no need to generate and create a static messaging interface to define the communication between a client object and a server object. There is no need to write, compile and link IDLs each time that a new object class is added to an application. Mediating component 204 locates the server object to process the client's message. Mediating component 204 identifies the expected method specification and arguments for the server. Mediating component 204 translates the client's message using information obtained about the server object.

The message is sent by mediating component 204 to the server object. Mediating component 204 uses a distributed object model or protocol to forward the message to the server object. The distributed object model is preferably NeXT's DO. However, other distributed object models (e.g., CORBA or Microsoft's Network OLE or Distributed COM) can be used.

Thus, for example, when a connection request is received in System A, mediating component 204 determines whether a server object in System B can service the message. For example, mediating component 204 queries information available in object model B to determine whether a server object exists in that system and created in that model that can process the message using the arguments supplied by the client object. If a server object exists, mediating component 204 determines the method specification and the number and type of arguments expected by the server object. If necessary, mediating component 204 returns a proxy object to the requester. When a message is directed to the server object via the proxy object, mediating component 204 performs a mapping, or translation, of arguments for use by the server object. Mediating component 204 then immediately translates the message such that it can be understood by the server object, and forwards the translated information to the server object. In this way, the mediating component 204 carries out dynamic translation at run-time.

Mediating component 204 provides a set of mappings between objects and object models. When a reference is made by a client object for a server object, mediating component 204 manages a reference by a client object to a server object. In addition, if the server is a part of a network, mediating component 204 locates the server object by querying each of the plurality of servers running on the network. A reference to the server object is managed by mediating component 204. Thus, mediating component 204 provides a mapping between objects implemented using like or different object models. For example, mediating component 204 creates a proxy object and a stub object. The proxy object maintains a reference to the client object. The stub object maintains the reference to the server object. Mediating component 204 maps an association between a proxy object and the stub object. If the server object is found, the server object's calling format is returned to mediating component 204. Mediating component 204 uses the calling format information to translate the client object's message for use by the server object.

Mediating component 204 can reside on either the client or the server and can run in a process (i.e., a discrete address space) or in a single-process machine. Preferably, mediating component 204 resides on a computer that is running a windowing environment such as Microsoft Windows. That is, mediating component 204 can function with any operating environment having the ability to send and receive messages. Further, the functionality of mediating component 204 described with reference to objects can be implemented in an environment other than an object-oriented environment.

Object messages can be sent in either direction between client and server. Thus, for example, an object message that originates in an object implemented using object model B in System B (System 206) is transmitted to and processed by a server object implemented using object model A in System A (System 202). A response can be sent between the server object in System A and the client object in System B (System 206). Similarly, a client object implemented using object model A in System A (System 202) generates a message that is sent to a server object implemented using object model B in System B (System 206). A response that is generated by the server object in System B is transmitted to the client object in System A.

Figure 3A:
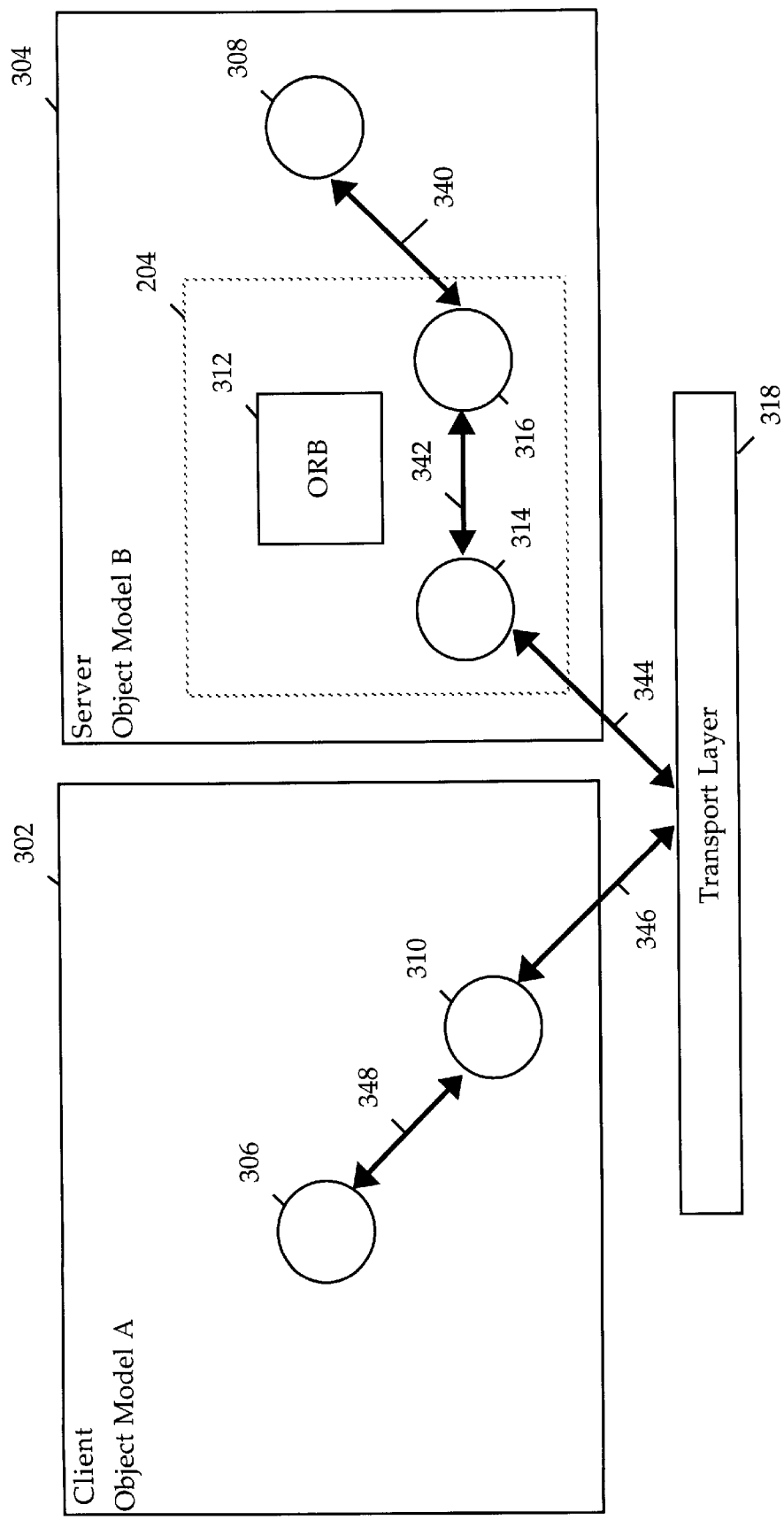
FIGS. 3A–3C provide configuration examples according to embodiments of the present invention.
Figure 3B:
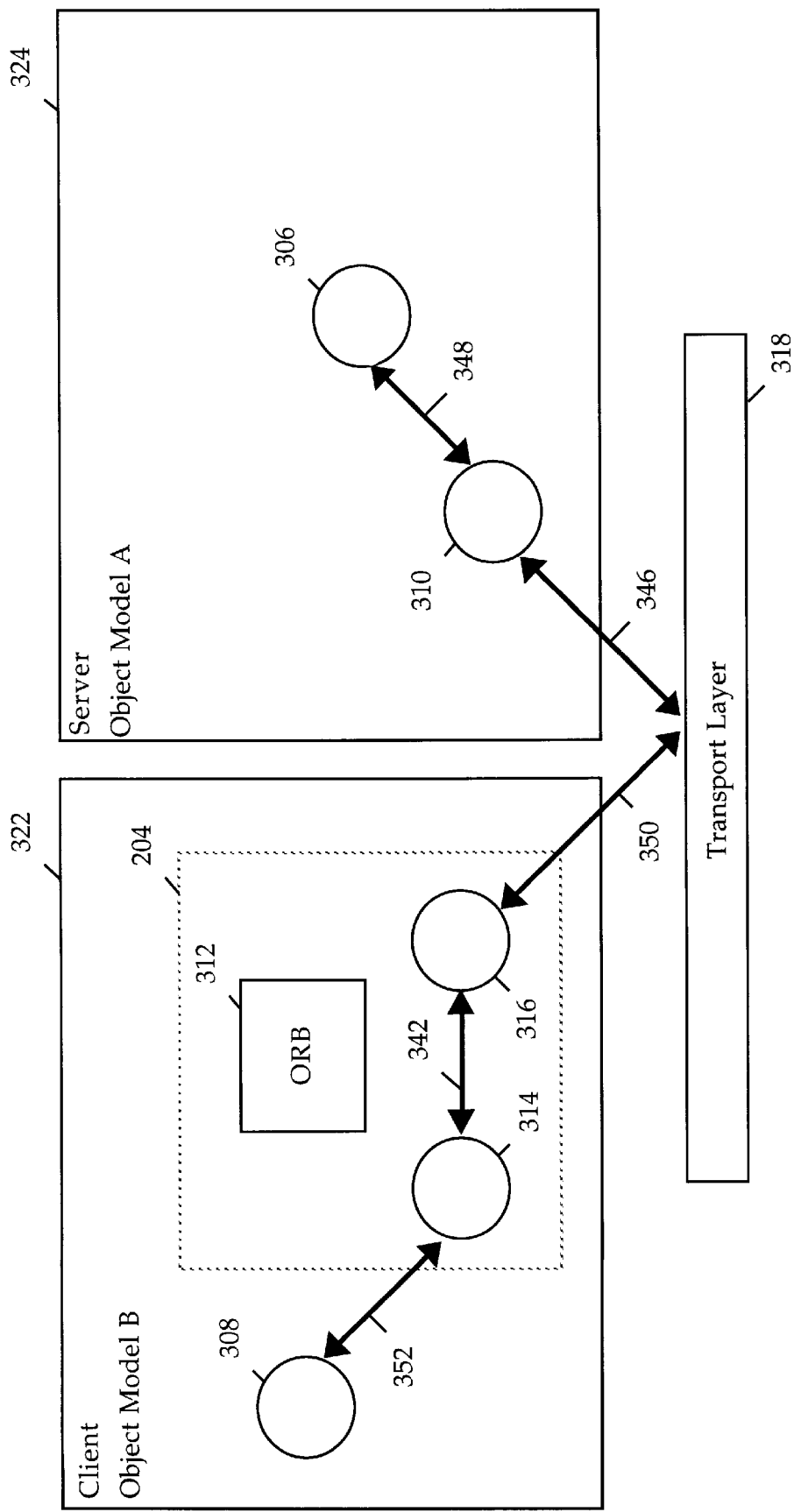
Figure 3C:
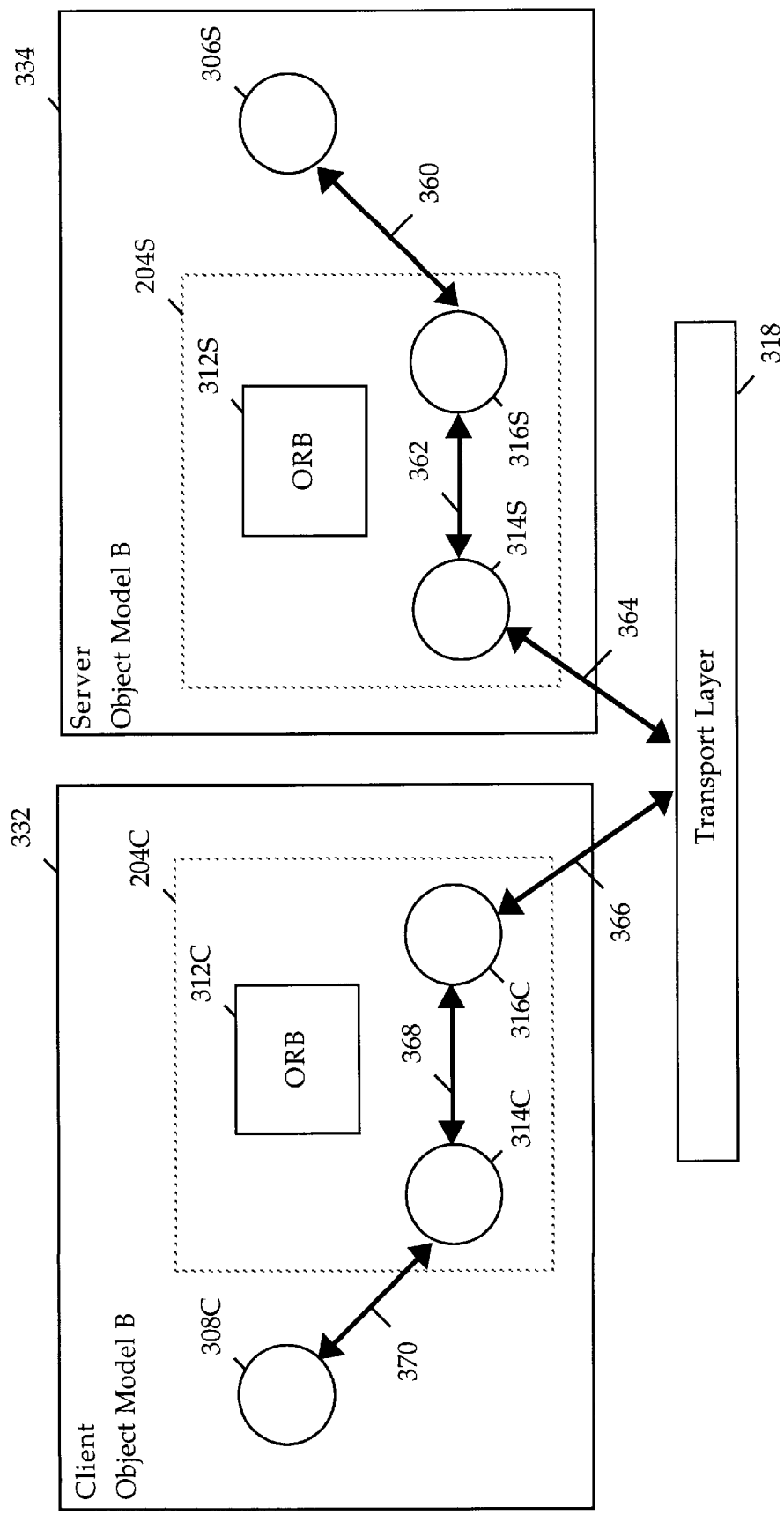

FIGS. 3A–3C provide configurations for exemplary embodiments of the present invention. Referring to FIG. 3A, mediating component 204 resides on server machine 304. Server machine 304 is running, for example, a Visual C++ application program under Microsoft Windows and using OLE/COM as Object Model B. A client machine 302 is running, for example, an Objective-C application program using Object Model A in NeXT's NEXTSTEP 3.3 environment or OPENSTEP 4.0 for Windows NT using NeXT's D'OLE™ Distributed OLE software, Distributed Object (DO), or Portable Distributed Objects (PDO) object models. Client object 306 is implemented using Object Model A on client machine 302. Client object 306 transmits a message directed to server object 308. Server object 308 is implemented using Object Model B on server machine 304. Machines 302 and 304 may also be processes rather than physical machines.

The message generated by client object 306 is directed to server object 308 on server machine 304 (i.e., a remote object with respect to client object 306). A mechanism is used by client machine 302 to forward the message to the remote object's machine (e.g., server 304). The forwarding mechanism is, for example, that used in NeXT Software Inc.'s DO system or the technology disclosed in U.S. Pat. No. 5,481,721 entitled Method for Providing Automatic and Dynamic Translation of Object Oriented Programming Language-Based Message Passing into Operation System Message Passing Using Proxy Objects and assigned to NeXT Software, Inc. In NeXT's DO, a proxy object 310 is used to represent the remote object (e.g., server object 308). By using proxy object 310, client object 306 does not need to obtain the actual location of server object 308. Client object 306 sends a message directed to server object 308 via proxy object 310 and connection 348. Proxy object 310 forwards the message to proxy object 314 on server 304 via transport layer 318. That is, proxy object sends the message to transport layer 318 via connection 346. Transport layer 318 sends the message to proxy object 314 via connection 344. Transport layer 318 uses a mechanism for transporting the message to a remote machine such as, for example, Transmission Control Protocol/Internet Protocol (TCP/IP). Remote Procedure Calls, such as the RPC facilities of MS Windows NT, is another example of a mechanism that can be used to forward a message to a remote machine.

ORB 312 runs on server machine 304. ORB 312 acts as a control module that receives a message initiated by a client and creates a dynamic mapping between the client and a server to enable transmission of messages. During execution, ORB 312 is capable of creating a dynamic messaging interface between two objects or processes using separate object models.

Figure 8A:
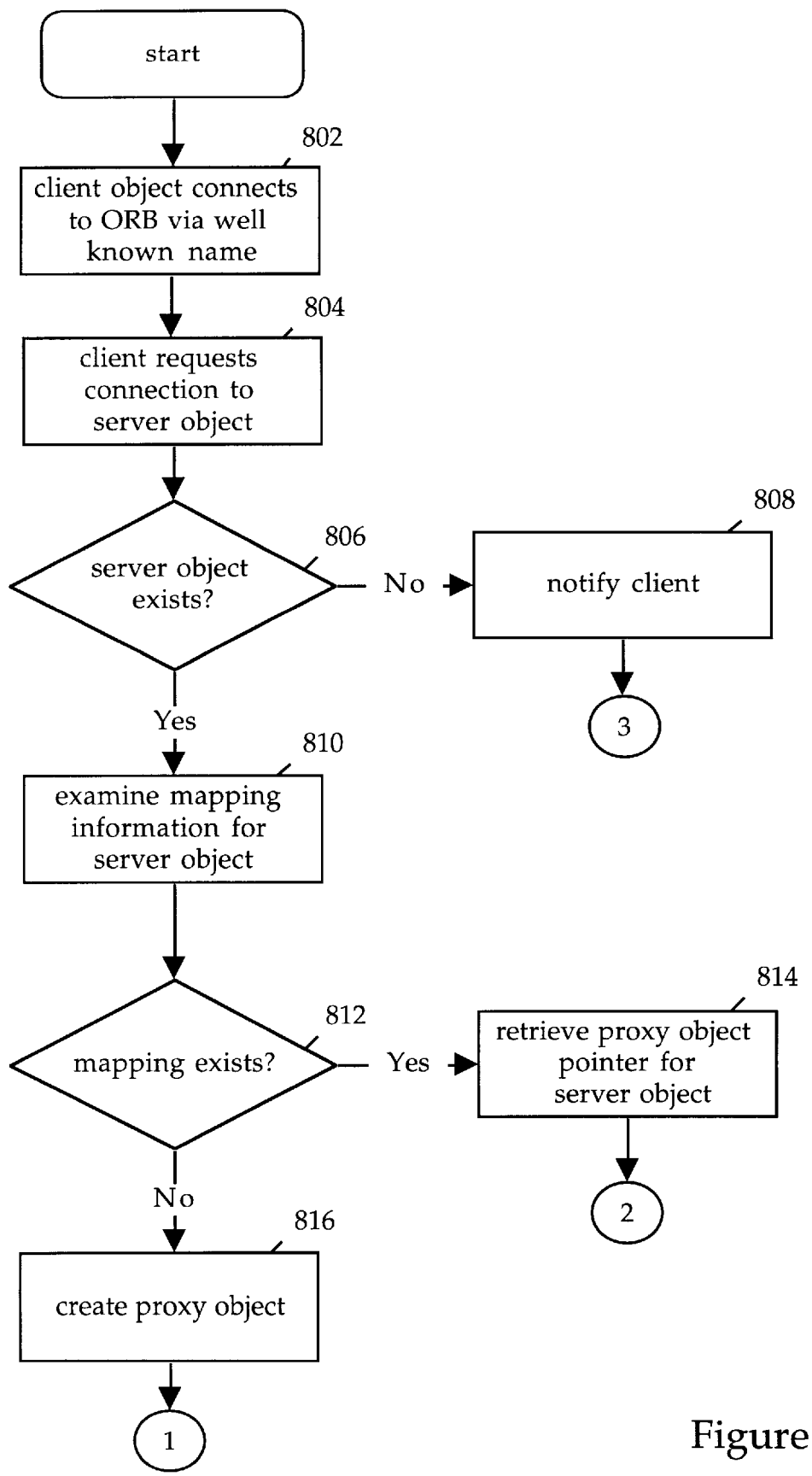
FIGS. 8A–8B provide an example of a process flow for establishing a connection and generating a mapping between client and server objects according to an embodiment of the invention.
Figure 8B:
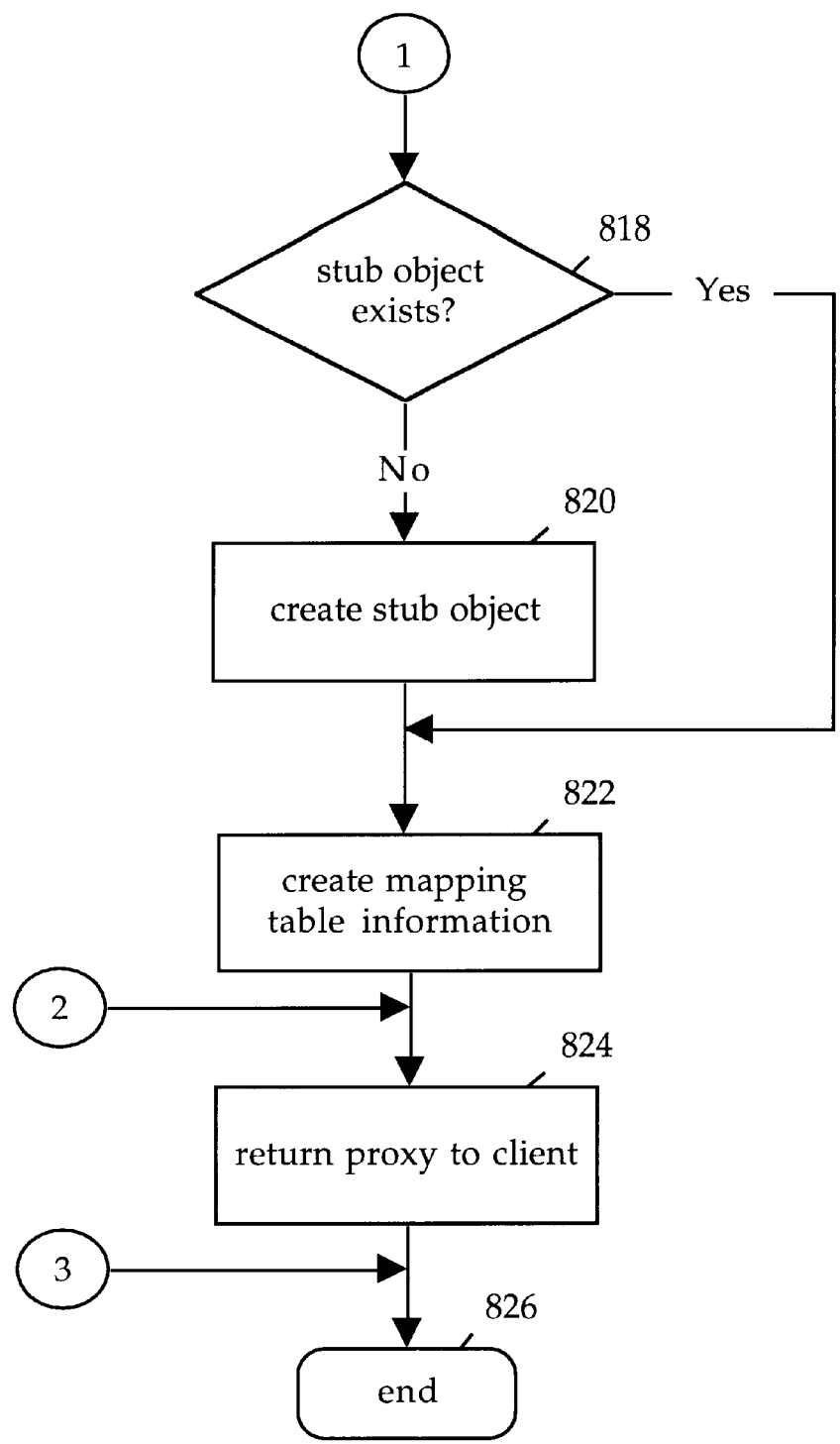

When it is invoked, ORB 312 vends itself on the network. That is, ORB 312 registers on the network using a name or identifier. Other objects on the network can locate ORB 312 using its registered name. Client object 306 connects to ORB 312 via its well known (or registered) name. FIGS. 8A–8B provide an example of a process flow for establishing a connection and generating a mapping between a client and server object according to an embodiment of the invention.

At step 802, client object 306 connects to ORB 312 via its well known name. Client object 306 requests a connection to server object 308 at step 804. At step 806 (i.e., "server object exists?"), ORB 312 determines whether server object 308 is available on server machine 304. To identify a server object, for example, ORB 312 communicates with an interface repository or object database for each object model that resides on server machine 304 to locate server object 308.

(Under MS OLE/COM, the object database is termed a COM server and is implemented as a .DLL or .EXE file.) If server object 308 does not exist, ORB 312 can notify client object 306 at step 808, and processing ends for the current request at step 826.

If ORB 312 determines (at step 806) that server object 308 does exist, processing continues at step 810 to examine mapping information for server object 308. ORB 312 stores mapping information from previous connections. The mapping information can be stored in one or more tables, for example. The mapping information includes an association between a proxy object and its related server object and the server object's stub object. For example, a mapping table entry for server object 308 contains a pointer to server object 308, stub object 316 and proxy object 314. At step 810, ORB 312 examines the mapping information to determine whether a mapping entry exists for server object 308.

At step 812 (i.e., "mapping exists?"), if a mapping entry exists for server object 308, processing continues at step 814 to retrieve the pointer to the proxy object associated with server object 308 (e.g., proxy object 314 in FIG. 3A). If it is determined (at step 812) that there is no mapping information for server object 308, processing continues at step 816 to create a proxy object for server object 308 (e.g., proxy object 314).

At step 818 (i.e., "stub object exists?"), ORB 312 makes a determination whether stub object 316 exists for server object 308. If it does not exist, processing continues at step 820 to create stub object 316 and processing continues at step 822. If it does exist, processing continues at step 822. At step 822, ORB 312 creates an entry in the mapping table that identifies server object 308, proxy object 314, and server object 316. At step 824, ORB 312 returns proxy object 314 to client object 306. Processing ends for the connection request at step 826.

Thus, when a connection request is received from client object 306, ORB 312 establishes a connection between client object 306 and server object 308. The connection between client object 306 and server object 308 is formed via proxy object 314 and stub object 316. Client object 306 can then send a message to server object 308 using the connection. When a request (e.g., a message from client object 306 to execute a method of an object created under the Microsoft Excel application program running in OLE/COM on server machine 304) is transmitted to server machine 304, ORB 312 intercepts the message. The connection established between client object 306 and server object 308 by ORB 312 is used to transmit the message to server object 308. A response generated by server object 308 is sent to client object 306 via the same connection.

As illustrated in FIG. 3A, the connection can be indirect and consist of multiple components and connections. Client object 306 is connected to proxy object 310 via connection 348. Connection 346 forms a connection between proxy object 310 and transport layer 318. The message is sent by transport layer 318 to server machine 304 and received by proxy object 314 via connection 344. Proxy object sends the message to server stub 316 via 342. Stub object 316 sends the message to server object 308 via connection 340.

Proxy object 314 and stub object 316 handle the message received from client object 306. For example, proxy object 314 receives a DO message sent by client object 306 via proxy object 310 and transport layer 318. Proxy object 314 forwards the message to stub object 316. Stub object 316 translates the message and its arguments so that the arguments can be understood by server object 308 (e.g., an object created with Microsoft's Excel running in the OLE/COM object model). For example, stub object 316 translates the message's operation into an operation identifier that is expected by server object 308. In addition, one or all of the message's arguments can be translated for server object 308. For example, if the server object is expecting an object as one of its arguments, stub object 316 can translate an argument contained in the message sent by client object 306 into this expected object.

Stub object 316 forwards the message to server object 308. Server object 109 processes the message (e.g., it executes a requested message) and returns a response to stub object 316. Stub object 316 performs argument translation for the response. The response is received by stub object 316 and forwarded to proxy object 314. Proxy object 314 translates the response using the protocol of object model A (the protocol of client object 306) and packages the response for transmittal across transport layer 318. The response is transmitted to proxy object 310 via transport layer 318. Proxy object 310 forwards the response to client object 306.

In FIG. 3A, mediating component 204 resides on the server machine. Alternatively, mediating component 204 can reside on the client machine. FIG. 3B provides a configuration example wherein mediating component 204 is resident on the client machine. The client machine 322 is using the OLE/COM object model under Microsoft Windows, for example.

As described above, ORB 312 of mediating component 204 vends itself on the network. When a request is made, ORB 312 creates the proxy and/or stub object, if they don't already exist. In addition, ORB 312 monitors and intercepts messages. A connection can be established between client object 308 and server object 306 using the process flow exemplified in FIGS. 8A–8B, for example. When client object 308 transmits a request to server object 306, ORB 312 intercepts the message.

As in FIG. 3A, the connection between the client and server objects uses one or more connection and components. Client object 308 is connection to server object 306 via proxy object 314, stub object 316, transport layer 318 and proxy object 310 using connections 352, 342, 350, 346, and 348.

In some instances, a client object may query whether a server object can respond to a request before the client object actually sends the request. In this case, mediating component 204 responds in the affirmative. That is, if client object 308 sends a query message initially, mediating component 204 responds by indicating that it is able to respond to the request. In so doing, mediating component 204 can eliminate the need to send the initial message across to the server and wait for a response. It is only necessary to transmit the request to the server. When client object 308 receives the affirmative response, it packages its request and arguments into a message using the protocol specified for object model B. Client object 308 sends the message to proxy object 314.

When the message is received, the proxy object 314 translates the message using the protocol specified by object model A. Proxy object 314 forwards the message to stub object 316. For example, proxy object 314 attempts to invoke the message and is also unable to perform the requested operation. As a result, proxy object 314 faults and forwards the message to stub object 316. Stub object 316 translates the arguments, if necessary, to correspond to the type of arguments expected by server object 306. Stub object 316 is unable to service the request. Stub object 316 packages the message for transmittal over transport layer 318 to proxy object 310 on server machine 324.

Upon receipt, proxy object 310 discards the transport layer packaging, and forwards the message to server object 306. Server object 306 services the request and returns its response using the messaging protocol of Object Model A. Server object 306 sends the message to proxy object 310. Proxy object 310 packages the response for transmittal across transport layer 318 to client machine 322. The response is received from transport layer 318 by stub object 316. Stub object 316 strips the transport layer packaging off the response. Using the mapping retained by ORB 312, the response is returned from stub object 316 to proxy object 314. Proxy object 314 translates the response using the messaging protocol of Object Model B. The return value is returned by proxy object 314 to client object 308.

The previous configuration examples in FIGS. 3A and 3B use an mediating component 204 on either the client or server machine. It is also possible for mediating component 204 to reside on both the client and server machines. FIG. 3C provides a configuration example wherein both the client and server machines include an mediating component.

The connection between the client object 308C and server object 306S is formed indirectly using multiple connections and components. Client object 308C connected to proxy object 314C via connection 370. Proxy object 314C is connected to stub object 316C via connection 368. Stub object 316C is connected to transport layer 318 via connection 366. Transport layer is connected via connection 364 to proxy object 314S. Proxy object 3149 is connected to stub object 316S via connection 362. Stub object 316S is connected via connection 360 to server object 306S.

Referring to FIG. 3C, client machine 332 and server machine 334 are both using Object Model B. However, Object Model B on client machine 332 does not have the ability to forward a message to Object Model B on server machine 334, and vice versa. That is, Object Model B does not have distributed object capability; it can not forward messages between objects that reside on different machines.

Using the configuration illustrated in FIG. 3C, for example, the present invention can be used to act as a bridge between instances of the same object model that reside on different machines. Thus, a non-distributed, non-networked object model can become a distributed, networked object model using the present invention.

Referring to FIG. 3C, client and server machines 332 and 334 are running Microsoft's Windows NT operating system which uses non-distributed OLE/COM, for example. The communication protocol used between mediating components 204C and 204S is a distributed object model such as NeXT's DO, for example. Client object 308C is executing on client machine 332. Server object 306S is executing on server machine 334. ORB 312C creates and manages proxy object 314C and stub object 316C. Similarly, ORB 312S creates and manages proxy object 314S and stub object 316S.

Client object 308C can forward a request to server object 306S via mediating components 204C and 204S. Client object 308C sends an initial query to determine whether its request can be processed. ORB 312C intercepts the message. ORB 312C responds to the query by stating that it can service the request. When the affirmative response is received by client object 308C, it packages its request and any arguments using Object Model B's messaging format.

Client object 308C sends the message which is intercepted by ORB 312C and processed by proxy object 314C. Since the message is intended for a server object in a like object model (i.e., server object 306S running in Object Model B), there is no need for proxy object 314C to translate the message into the server object's object model. However, it may be necessary to translate the arguments to accommodate the argument expectations of server object 306S as described above. Argument translation can be performed by mediating component 204C or 204S.

Proxy object 314C forwards the message to stub object 316C. Stub object 316C packages the message for transmittal to server machine 334 via transport layer 318. The message is intercepted by ORB 204S on server machine 334. Proxy object 314S strips off the transport layer packaging and forwards the message to stub object 316S. Stub object 316S forwards the message to server object 306S.

Server object 306S processes the message and forwards a response to stub object 316S. The message is forwarded to client object 308C via proxy object 314S, transport layer 318, stub object 316C and proxy object 314C. Argument translation can be performed on either client machine 332 by mediating component 204C or on the server machine 334 by mediating component 204S.

Thus, as described above, the mediating component of the present invention acts as a bridge between objects implemented using like or different object models. An mediating component can act as a bridge between two objects implemented using two instances of the same object model running on different machines. The invention enables the distribution of objects such as OLE Automation objects. An mediating component can reside on either the server machine, the client machine, or both.

Server-Side Bridge

Figure 4A:
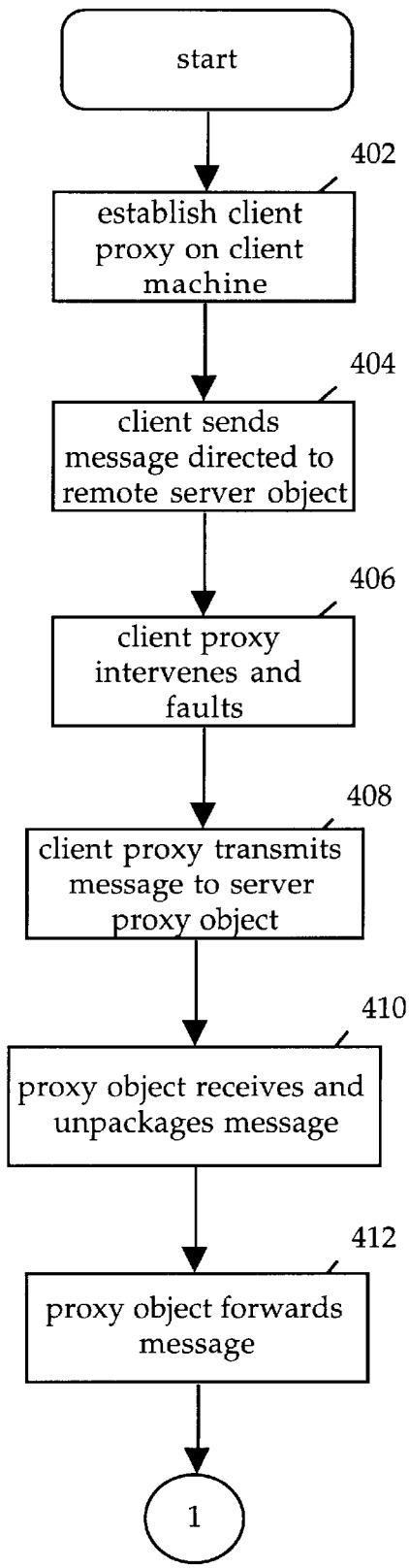
FIGS. 4A–4C provide a process flow according to an embodiment of the present invention for brokering object messages using a bridge on the server machine.
Figure 4B:
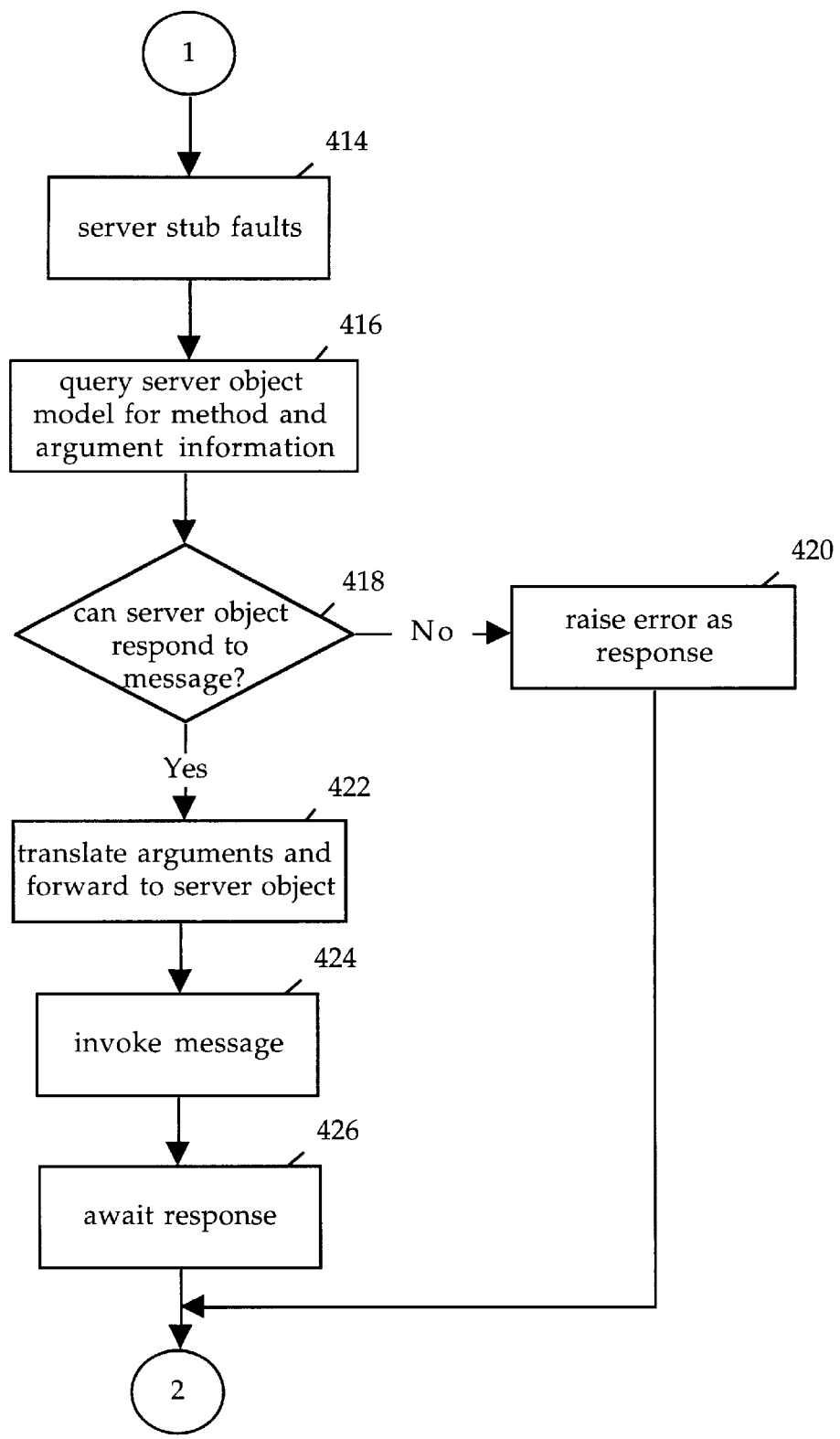
Figure 4C:
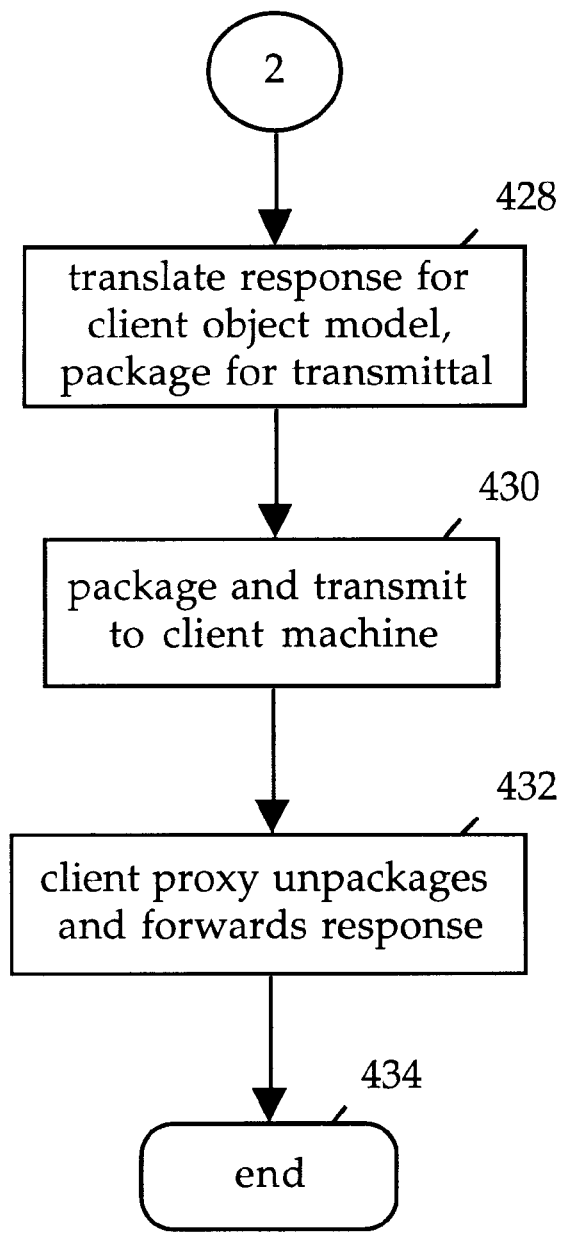

The bridging capabilities of the present invention can be implemented on the server machine. In one example, the server machine is running MS Excel software under the MS Windows operating system. The server machine is using the non-distributed OLE/COM object model. The bridging capabilities can be implemented as an executable file (.EXE) or dynamic link library (.DLL) in the Windows environment, for example. A client object executing on a client machine generates a request for processing by the MS Excel instance running on the server machine. The client machine is running NEXTSTEP or OPENSTEP using NeXT's DO object model with D'OLE or PDO. FIGS. 4A–4C provide a process flow for brokering object messages between NeXT's object model on a client machine and the OLE/COM on a server machine.

Referring to FIGS. 4A–4C, the client establishes a connection with the client proxy on the client machine at step 402. The connection can occur as a consequence of some user action, or on startup, for example. At step 404, the client sends a message directed to a remote server.

At step 406, the client proxy intercepts the message. Because the client proxy is unable to respond to the message, it enters a fault state. As a result of the fault state, the client proxy packages the message and forwards it via a transport layer to the server proxy object at step 408. At step 410, the server proxy object receives the message and strips off the transport layer packaging.

At step 412, the server proxy object sends the message to the stub object. The server stub attempts to perform the operation specified in the message and enters a fault state at step 414. At step 416, the server stub object queries the server object model for method and argument information of a server object.

At step 418 (i.e., "can server object respond to message?"), the server stub object determines whether the server object to which the message is directed is capable of responding to the message. For example, the server stub object invokes a GetIDsofNames routine to determine whether the specified method is a valid method of the server object. The GetIDsOfNames method converts text names of properties and methods into a corresponding set of dispIDs that uniquely identify a method and arguments. If the method or arguments are invalid (e.g., there is no dispID for a specified method or argument), the server stub object raises an error response at step 420 and processing continues at step 428 to forward the response to the client object.

If it is determined that the server object can respond (i.e., the test of step 418 is affirmative), processing continues at step 422 to translate the arguments for the receiving object model (i.e., the server object's object model). For example, an OLE/COM data structure is created and the arguments are stored in the data structure. In addition, the server stub object can convert an argument from its original type to one expected by the server object. For example, if the server object expects an object as an argument but the client specified a non-object value, the server stub converts the argument to an object. Similarly, a numeric argument can be converted to a string, for example.

At step 424, the client object's message is invoked on the server object. For example, to invoke a method using an object in the OLE/COM object model, the Invoke method is called on the COM server object specifying the DispID as an argument. The arguments are retrieved from the OLE/COM data structure. The method is identified by specifying the method's identifier (DispID).

At step 426, the server stub waits for a response generated from the method invoked in the server object. At step 428, the server stub translates the response. The response can be a response received from the method processing, or from an error condition raised during processing, for example. The response is packaged and transmitted across the transport layer to the proxy object on the client machine at step 430. At step 432, the message is unpackaged by the client proxy object and returned to the client object. Processing ends at step 434.

Client-Side Bridge

Figure 5A:
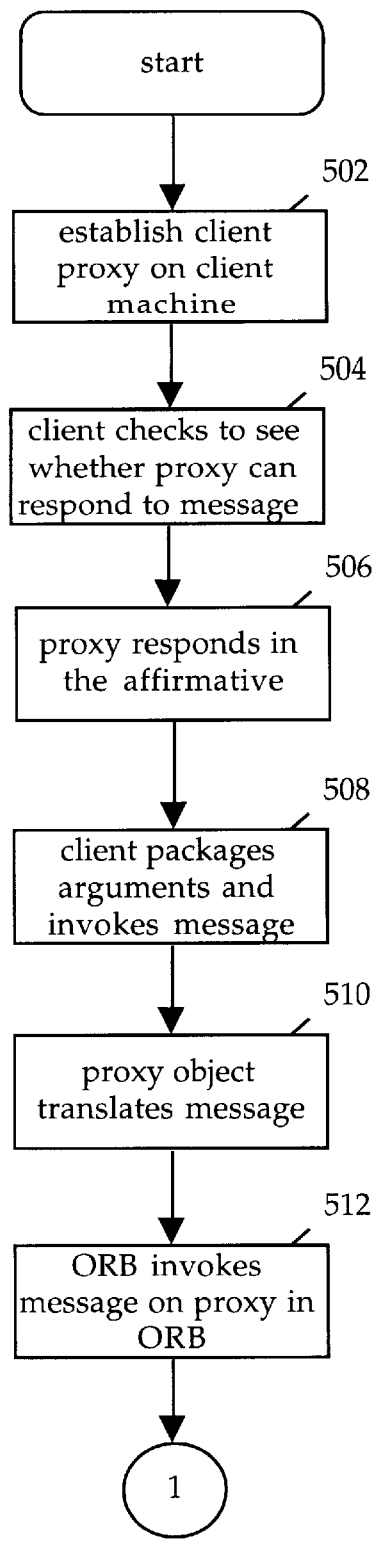
FIGS. 5A–5C provide a process flow according to an embodiment of the present invention for brokering object messages using a bridge on the client machine.
Figure 5B:
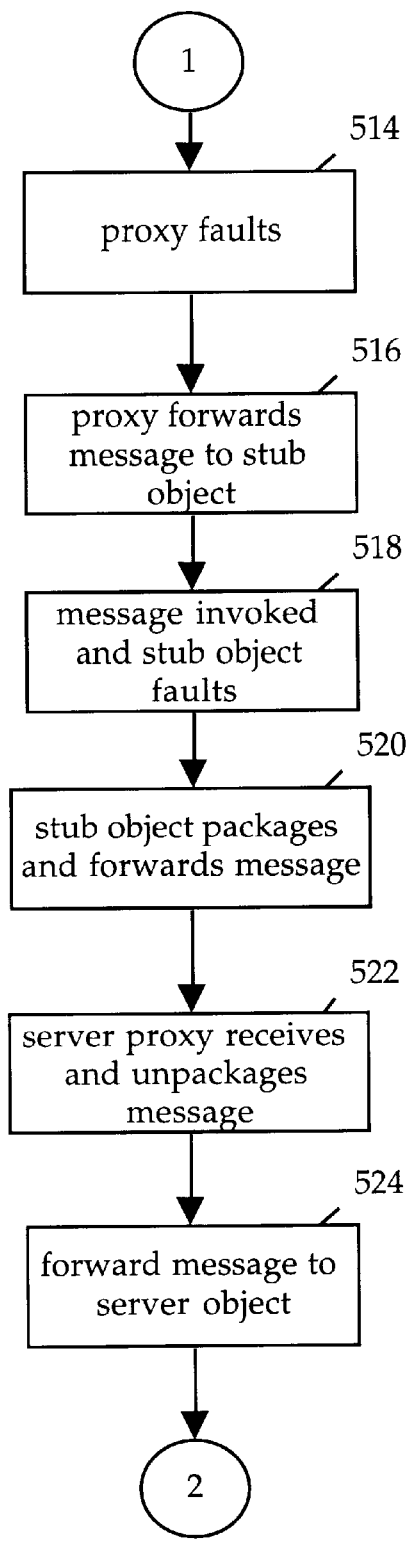
Figure 5C:
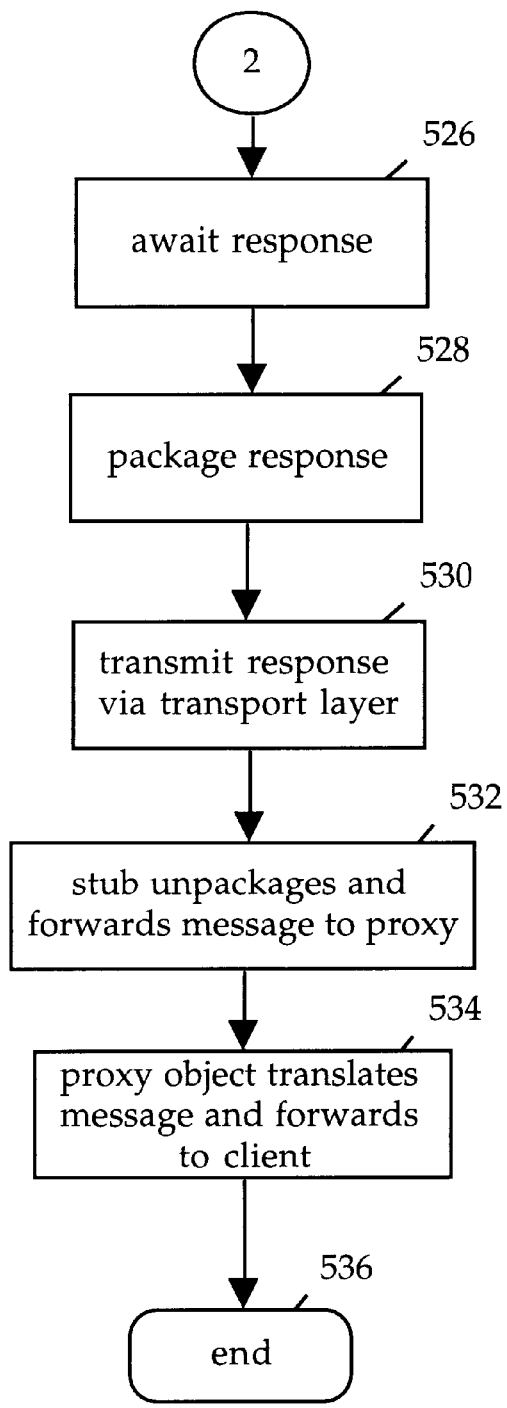

The bridging capabilities of the present invention can be implemented on the client machine. In one example, the client machine is running MS Word in the Windows environment. The client machine is using the OLE/COM object model. An object created (instantiated) by MS Word generates a message request to print a document on a PostScript printer on a server machine. The server machine is running NEXTSTEP or OPENSTEP using NeXT's DO object model with D'OLE or PDO. FIGS. 5A–5C provide a process flow for brokering object messages between the OLE/COM object model on a client machine and NeXT's object model on a server machine.

At step 502, the ORB creates the proxy object on the client machine. The ORB can create the proxy object as a result of a request from a client object, for example. At step 504, the client object queries the proxy object to determine whether it can process the client object's request. As previously described, the OLE Automation mechanism uses a two message approach. A first message from the client object queries the server object for a dispID. That is, the client object sends a GetIDsOfNames to identify the dispID of the method. In the prior art, the server object responds by either sending a dispID (if the method identified by the sender is valid), or by sending an error (if an invalid method is specified by the client object). If a dispID is returned, the client object sends a second message to server object using the dispID of the method.

In addition to the messaging load on the network, this approach requires that the communication between a client and server be permitted only after a method is identified. Thus, if the client object wishes to invoke another method on the server object, it must use the two message approach to identify a new dispID. Further, if a new method is added by the server object, a new proxy and stub implementation must be established between the client and server objects.

In contrast, the invention uses a technique that allows a client object to send a message of which the server object has no knowledge. The server object can add new methods without any change being made on the client side. When the client object sends a GetIDsOfNames message to obtain the dispID for a method of the server object, the invention dynamically creates a unique ID for the requested method, if one doesn't already exist. The invention uses this ID to respond to the client object's first message. The response includes the unique ID. In so doing, the invention indicates that a server object is able to perform the desired method (i.e., the invention responds affirmatively to the client object's first message). This unique ID is retained along with the name of the requested method. The unique ID is used to invoke to query the server for the requested method when the client object sends a second, invocation message.

Thus, when the proxy object receives the message sent by the client object in step 506, it returns an affirmative response that indicates that the client object's request can be processed. The response includes the unique ID to identify the method which the ORB retains to identify the message when the client invokes it. The client object creates a message (e.g., operation specification and arguments) that includes the tag using the OLE/COM message protocol at step 508. At step 510, the proxy object translates the client object's message for use on the server machine's object model (e.g., NeXT DO).

At step 512, the message is invoked on the proxy object previously set up by the ORB. The proxy object is unable to perform the specified operation and faults at step 514. At step 516, the proxy object forwards the message to the stub object. The stub object attempts to perform the message's operation and faults at step 518. At step 520, the stub object packages the message and forwards the message via the transport layer to the server machine.

The proxy object receives the message and strips off the transport layer's message packaging at step 522. The server proxy object forwards the message to the server object at step 524. The server proxy object waits for a response from the server object at step 526. At step 528, the response sent by the server object is translated for transmittal via the transport layer by the server's proxy object. The message is transmitted via the transport layer to the client's stub object at step 530. At step 532, the stub object strips off the transport layer packaging and forwards the message to the client machine's proxy object. At step 534, the proxy object translates the message using the client object's object model and returns the response to the client object. Processing ends at step 536.

Client and Server Bridge

Figure 6A:
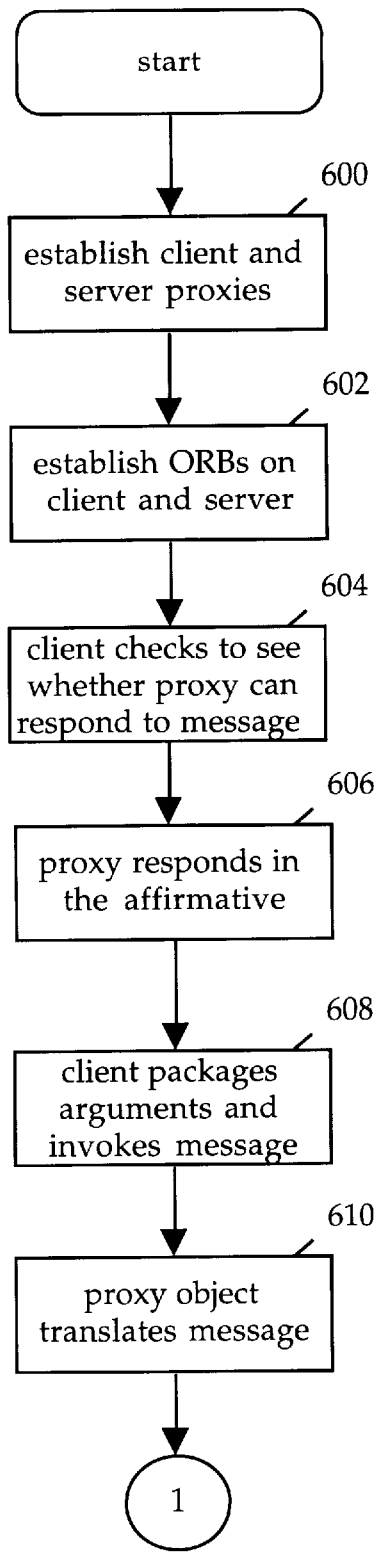
FIGS. 6A–6C provide a process flow according to an embodiment of the present invention for brokering object messages using a bridge on both the client and server machines.
Figure 6B:
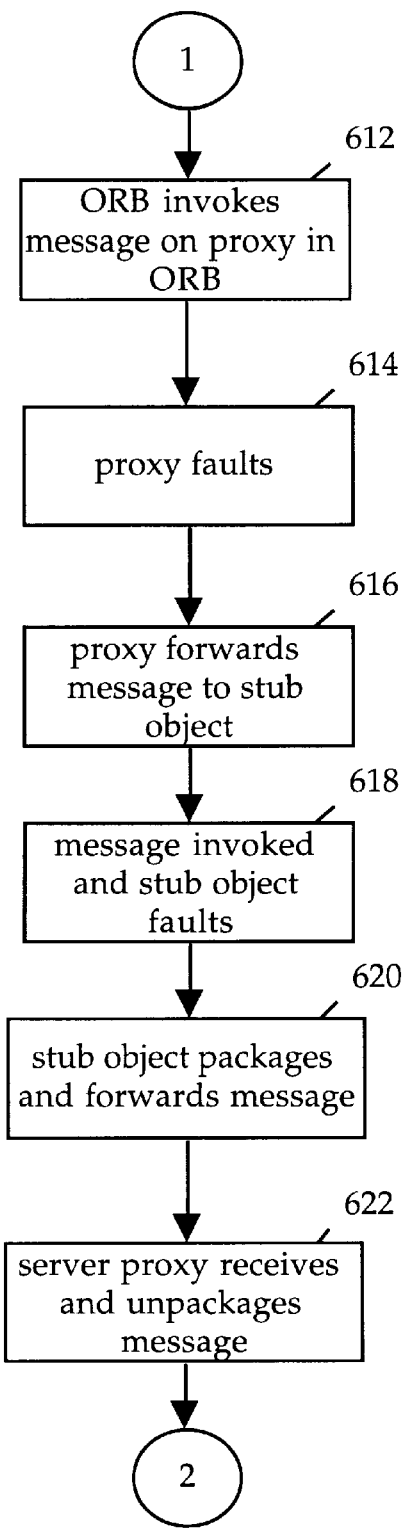
Figure 6C:
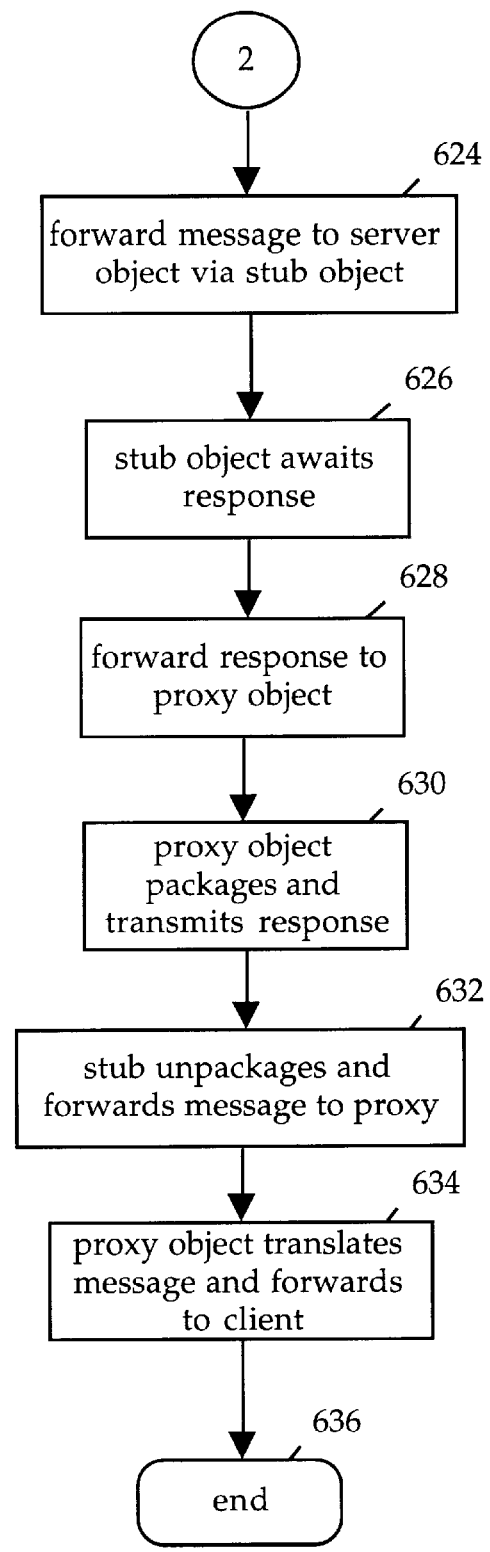

The bridging capabilities of the present invention can be implemented on both the client and server machines. Using the present invention, a non-networked object model (e.g., OLE/COM) can communicate across machines. In one example, both the server and client machines are running the MS Windows environment and using the OLE/COM object model. A client object created (instantiated) by MS Excel on the client machine generates a request message for processing by an object instantiated by the MS Word application program running on the server machine. Using the present invention, the Excel object can send a message to the MS Word object on another machine. FIGS. 6A–6C provide a process flow for brokering object messages between OLE Automation objects running on different machines.

At step 602, ORBs on the server and client machines are created. Client and server proxies are established by the ORBs. The ORBs monitor for messages and intercept messages from a client object to a server object. Steps 604 and 606 correspond to steps 504 and 506 of FIG. 5A. At step 604, the client object queries the proxy object (e.g., GetIDsOfNames) to determine whether it can process the client object's request. The proxy object responds in the affirmative and includes a unique ID for the method at step 606. In so doing, the invention provides a mechanism that allows a client object to send a message to a server object that the server object is previously unaware. The server object can add new methods without any change being made to the client object. As far as the client object is concerned, the unique ID sent by the proxy object is the dispID of the actual method in the server object.

The client object creates a message (e.g., operation specification and arguments) including the tag and using the OLE/COM message protocol at step 608. At step 610, the proxy object translates the client object's message. There is no need to translate the message from one object model protocol to another since both client and server objects are using the same object model. However, the proxy object can translate arguments into the types that are expected by the server object, if that is required.

At step 612, the message is invoked on the proxy object. The proxy object is unable to perform the specified operation and faults at step 614. At step 616, the proxy object forwards the message to the stub object. The stub object attempts to perform the message's operation and faults at step 618. At step 620, the stub object packages the message and forwards the message via the transport layer to the server machine.

The message is received by the proxy object on the server machine and strips off the transport layer's message packaging at step 622. The server proxy object forwards the message to the stub object which in turn forwards the message to the server object at step 624. The server proxy object waits for a response from the server object at step 626. At step 628, the stub object forwards the response to the proxy object. The proxy object packages the response and forwards it to the client machine via the transport layer at step 630. At step 632, the stub object strips off the transport layer packaging and returns the response to the client machine's proxy object. At step 634, the proxy object translates the response (e.g., returns a value translation) and returns the response to the client object. Processing ends at step 636.

Argument Translation

The invention allows an object to communicate with another object regardless of the object models used to implement the objects. A message sent by an object implemented using one object model can contain arguments that are used by another object that is implemented using a second object model. Each argument has a type (e.g., numeric, string, and object). The argument types used by the sending object may be incompatible with those used by the receiving object. The invention provides a mechanism to translate these incompatible argument types.

In the NEXTSTEP or OPENSTEP environment, arguments can be passed as a value or an object, for example. Examples of the types associated with a value are short, long, integer, and float. An argument can be an object such as the NSString object type, or class. NSString that includes string functionality is one example of an object class supported by NEXTSTEP and OPENSTEP. An argument can be an object that is an instance of any of the object classes supported by NEXTSTEP and OPENSTEP.

In a Windows environment, an argument can be a value of type short, long, integer, float and double, for example. In addition, the OLE/COM object model supports types such as OLE String and OLE Automation. An OLE String type is used for arguments of type string.

OLE Automation is a subset of OLE/COM that is used to dynamically invoke methods that manipulate the contents of scriptable objects. OLE Automation provides classes of objects that include automation servers, automation controllers, collection, application, document, documents, and font referred to herein as OLE Automation objects.

As indicated in the discussion above, there are some argument types that can be passed between two environments without translation. However, some argument types are unique to, or incompatible with, the argument types of another environment. Therefore, a translation mechanism is needed to allow arguments to pass between the environments.

The translation mechanism of the invention is implemented in the mediating component. Referring to FIGS. 3A–3C, for example, the translation mechanism is implemented in mediating component 204, 204C, and 204S. The translation can be performed in either the proxy or stub objects. If delayed stack creation is used, argument translation is optimally performed by the last intervening object (e.g., stub object 316 for server object 308 or stub object 316 for server object 306).

The translation mechanism processes each argument in a message and a response. The type that is given by the sending object and the type expected by the receiving object are compared. If the types are incompatible, a translation is performed to convert the sending type to the receiving type. The following functionality can be used to translate arguments having unique, or incompatible, types between the NEXTSTEP/OPENSTEP and Windows (or OLE) environments. It should be apparent that the translation mechanism can be adapted for use between any two environments. An example of program code that implements argument translation between the NEXTSTEP/OPENSTEP and OLE environments is provided in the section entitled "Translation Code Examples".

NEXTSTEP/OPENSTEP to OLE

Figure 7A:
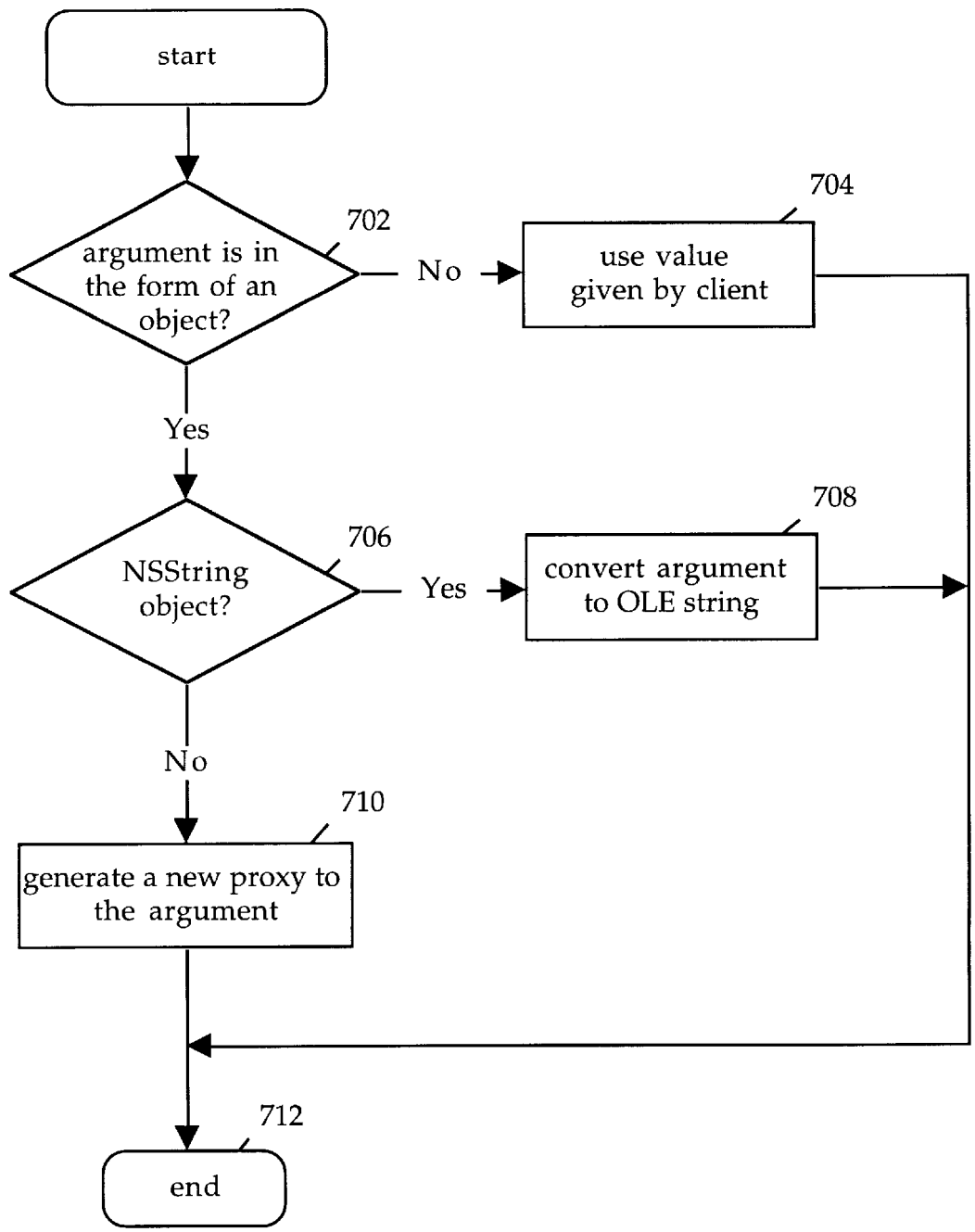
FIG. 7A provides an example of a process flow for translating argument types from the NEXTSTEP/OPENSTEP environment to the Windows environment according to an embodiment of the invention.

The NEXTSTEP/OPENSTEP environment includes object classes such as NSString that are incompatible with a Windows object class. Numeric argument types can be passed without translation. Therefore, a translation is needed for certain argument types used in the NEXTSTEP/OPENSTEP before the arguments can be passed to the Windows environment. FIG. 7A provides an example of a process flow for translating argument types from the NEXTSTEP/OPENSTEP environment to the Windows environment according to an embodiment of the invention. The process flow of FIG. 7A is performed for each argument in a client object's message or any return values contained in a server object's response.

At step 702 ("argument is in the form of an object?"), a determination is made whether the argument is an object. If it is not an object, the value is passed to the object running in the NEXTSTEP/OPENSTEP environment as a value. That is, there is no need to translate the argument, and the translation processing for that argument ends at step 712.

If it is determined that the argument is in the form of an object (an affirmative determination is made at step 702), processing continues at step 706 to identify the object's type, or class. At step 706 ("NSString object?"), a determination is made whether the object is an NSString object. If it is determined that the object is of class NSString, processing continues at step 708 to convert the argument to an OLE string type argument, and processing ends for the current argument at step 712. If it is determined that the argument is not an NSString object (at step 706), processing continues at step 710 to generate a proxy object for the object. The proxy object can be used to transmit message to and from the object argument, for example. The current argument's translation processing ends at step 712.

OLE to NEXTSTEP/OPENSTEP

Figure 7B:
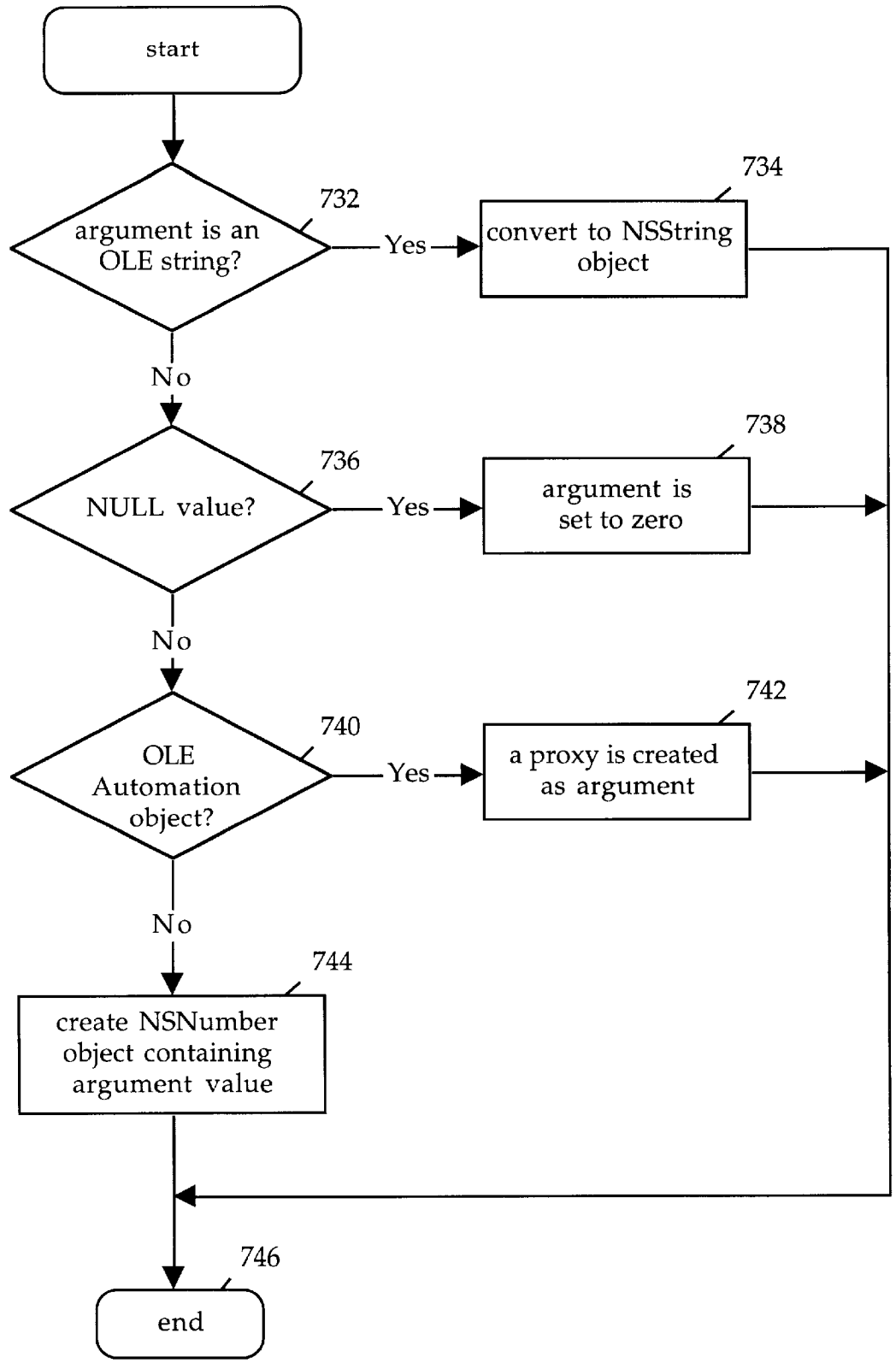
FIG. 7B provides an example of a process flow for translating argument types from the Windows environment to the NEXTSTEP/OPENSTEP environment according to an embodiment of the invention.

The Windows environment includes object classes such as the OLE Automation object classes that are unique to that environment. Therefore, a translation mechanism is needed before these arguments can be passed to the NEXTSTEP/OPENSTEP environment from the Windows environment. FIG. 7B provides an example of a process flow for translating argument types from the Windows environment to the NEXTSTEP/OPENSTEP environment according to an embodiment of the invention. The process flow of FIG. 7B is performed for each argument in a client object's message or any return values contained in a server object's response.

At step 732 ("argument is an OLE string?"), a determination is made whether the current argument is an OLE string. If so, processing continues at step 734 to convert the argument to an NSString object. For example, an instance of the NSString object class is instantiated and the string value is stored in a property of the NSString object instance. Processing then ends for the current argument at step 746.

If it is determined (at step 732) that the argument is not an OLE string, processing continues at step 736. At step 736 ("NULL value?"), a determination is made whether the value of the argument is set to NULL. If it is, processing continues at step 738 to set the value of the argument to zero and processing ends for the current argument at step 746. If not, processing continues at step 740 ("OLE Automation object?") to determine whether the argument is in the form of an OLE Automation object. If the argument is an OLE Automation object, processing continues at step 742 to create a proxy for the OLE Automation object. The proxy can be used to communicate with the OLE Automation object. Translation processing for the current argument ends at step 746.

If it is determined at step 740 that the argument is not an OLE Automation object, processing continues at step 744 to process a numeric argument value. At step 744, an NSNumber object is created and the numeric value is stored in a property of the object. Translation processing ends for the current argument at step 746.

Delayed Stack Creation

When an object processes a message, it retrieves the method and arguments from the message and pushes the arguments on a stack. This is referred to as unraveling the message. The object then invokes the method. In an environment where the message is sent from a client object to a server object via one or more intervening objects, it is unnecessary for each intervening object to unravel the message when the method is intended for another object and the intervening object is incapable of performing the requested operation. When the intervening object is unable to perform the requested operation after unraveling the message, it repackages the method and arguments and sends the message to the next object. This is unnecessary and inefficient. Thus, the invention optimizes processing of a message by an intervening object by delaying the method and argument retrieval and stack creation until he message is received by an object that is capable of performing the requested operation.

The invention optimizes the message transmission by eliminating the need to unravel the message at each intervening point. Referring to FIG. 3A, for example, it is unnecessary for both proxy object 314 and stub object 316 to unravel the message sent from client machine 302.

The invention waits until the message is received by the last intervening object (e.g., the server object's stub object) before the message is unraveled. Thus, for example, the message is not unraveled until it is received by stub object 316 in FIG. 3A. When proxy object 314 receives the message from client object 306, it passes the message to stub object 316. Proxy object 314 does not unravel the message.

Figure 9:
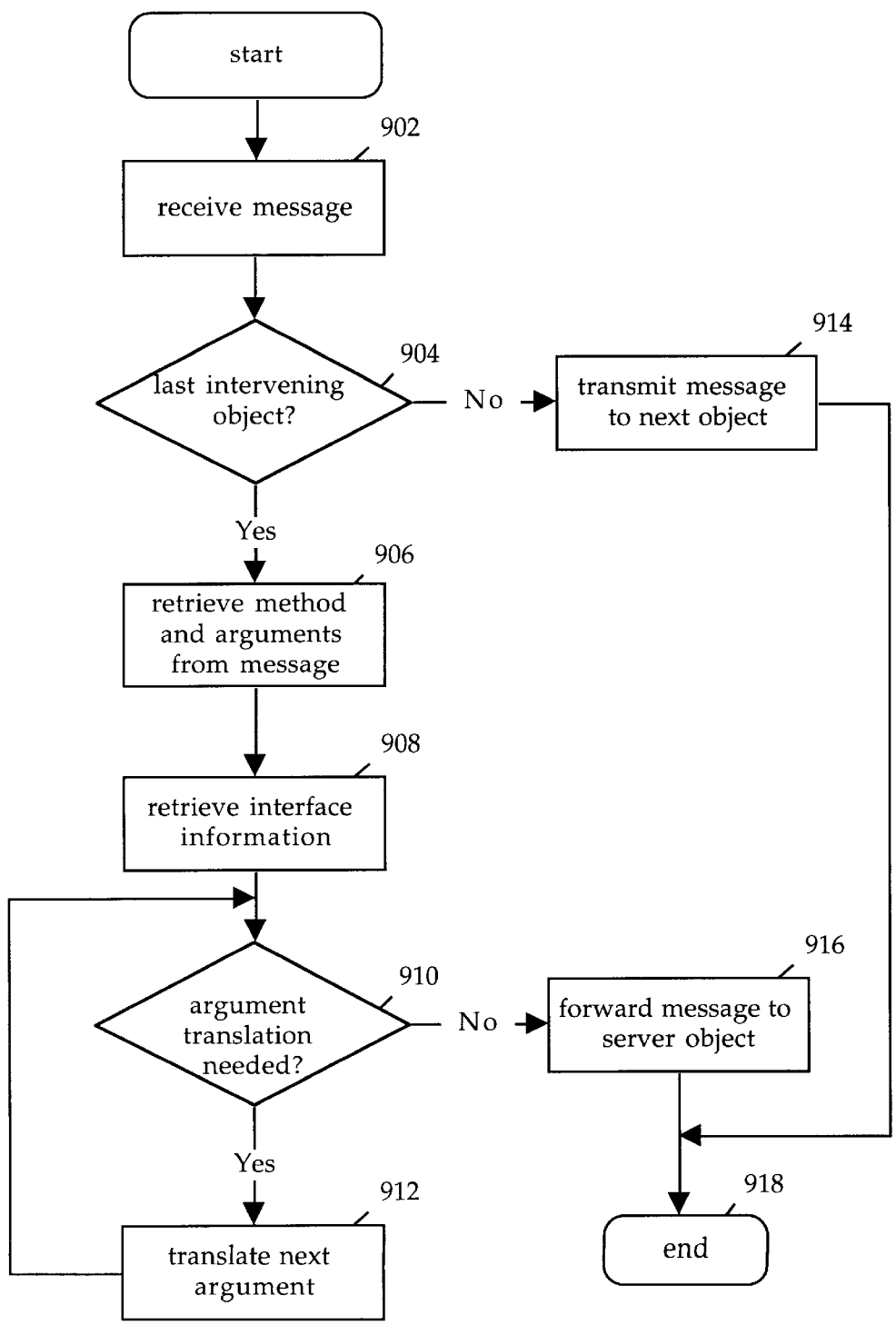
FIG. 9 provides an example of a delayed stack creation process flow according to an embodiment of the invention.

FIG. 9 provides an example of a delayed stack creation process flow according to an embodiment of the invention. At step 902, an object (e.g., proxy object 314) receives a message. At step 904 (i.e., "last intervening object?"), the object determines whether it is the last intervening object (e.g., stub object 316). If not, the object transmits the message to the next object at step 914 and processing for the current object ends at step 918. That is, if the object is not the last intervening object, it acts as a conduit for the message. It sends the message to the next object without unraveling the message. It does not build an argument stack or attempt to perform the operation specified by the message, for example.

If, at step 904, the object determines that it is the last intervening object, processing continues at step 906. The message is unraveled at step 906. The object retrieves the method and arguments from the message. At step 908, interface information is retrieved for the server object (e.g., server object 308). The interface information can be retrieved from an interface repository such as a COM server in MS OLE/COM, for example.

At step 910 (i.e., "argument translation needed?"), the object determines whether any argument translation is needed. If so, processing continues at step 912 to translate an argument. Processing then continues at step 910 to process any remaining arguments. If it is determined at step 910 that no argument translation is needed (or is completed), processing continues at step 916 to forward the message to the server object. At step 918, processing ends for the current message.

As illustrated in FIG. 9, an intervening object acts as a conduit sending the message to the next intervening object without unraveling the message. The last intervening object unravels the message and performs any necessary argument translation. Unnecessary message processing is therefore avoided and message transmission is optimized.

Translation Code Examples

The following provides code examples that translate arguments between the OLE (or Windows) and NEXTSTEP/OPENSTEP environments.

```
OLE to NEXTSTEP/OPENSTEP
#import <winnt-pdo.h>
/ /#include <next_common_defines.h>
#import <ole2.h>
#import <oleauto.h>
/ /#include <next_common_undefines.h>
#ifdef __GNUC__
#ifdef alloca
#undef alloca
#endif
#define alloca __builtin_alloca
#endif
#import <foundation/NSMethodSignature.h>
#import <foundation/NSInvocation.h>
#import <foundation/NSString.h>
#import <objc/Object.h>
#import <objc/Protocol.h>            /* for objc_method_description */
#import <foundation/NSException.h>
#import <Foundation/NSValue.h>
#import <Foundation/NSAutoreleasePool.h>
#import <Foundation/NSData.h>
#import <remote/NXProxy.h>
#import <remote/NXMethodSignature.h>
#import <ole-header-fixes.h>    /* For unnamed structures in the Microsoft header files. */
#import "INSObjectProxy.h"
#import "NSIDispatch.h"
#import "NSOLEBridge.h"
#import <Foundation/NSAutoreleasePool.h>
#define NS_POOL      {id _pool = [NSAutoreleasePool new]; do { {
#define NS_POPPOOL   [_pool release]
#define NS_ENDPOOL   }} while (0); [_pool release]; }
#define NS_VALRETURN(X) NS_VALUERETURN(X, typeof(X))
VARTYPE NSConvertToVARTYPE(VARIANTARG *varArg, const char* theInfo,
VARIANTARG *);
@interface NSString (wchar_extensions)
+ stringWithWCString:(wchar_t*)string;
- (void) getWCString:(wchar_t*)string;
@end
InitException(EXCEPINFO* excepInfo, UINT errCode, const char* source, const char*
description)
{
wchar_t *wDescription;
wchar_t *wSource;
unsigned int dSize = (strlen(description) * sizeof(wchar_t)) + sizeof(wchar_t);
unsigned int sSize = (strlen(source) * sizeof(wchar_t)) + sizeof(wchar_t);
unsigned int dLength = strlen(description);
unsigned int sLength = strlen(source);
if (!excepInfo)
    return;
    memset (excepInfd, 0, sizeof (EXCEPINFO));
    /* The sizes calculated above should be for wide strings.
       Note that we can't simply */
    /* add a 1 for the null character, instead we have
       to add sizeof(wchar_t). */
    wDescription = (wchar_t*)malloc(dSize);
    wSource = (wchar_t*)malloc(sSize);
    /* Convert the char*s to wide strings. */
    MultiByteToWideChar(CP_ACP, MB_PRECOMPOSED, description, dLength + 1,
            wDescription, dLength + 1);
MultiByteToWideChar(CP_ACP, MB_PRECOMPOSED, source, sLength + 1,
            wSource, sLength + 1);
/* Fill in the EXECPINFO structure. */
excepInfo->wCode = errCode;
excepInfo->wReserved = 0;
excepInfo->bstrSource = SysAllocString(wSource);
excepInfo->bstrDescription = SysAllocString(wDescription);
excepInfo->dwHelpContext = 0;
excepInfo->pvReserved = NULL;
/* Free our strings that we allocated. */
free(wDescription);
free(wSource);
}
/* Given the information to IDispatch::GetIDsOfNames( ), return */
/* the selector. */
static _stdcall _RPC_FAR HRESULT
COMNSObjectProxy_GetIDsOfNames(
                    COMNSObjectProxy *this,
                    REFIID riid,
                    LPOLESTR *rgszNames,
```

```
                    UINT cNames,
                    LCID lcid,
                    DISPID *rgdispid)
{
HRESULT returnValue = S_OK;
NS_POOL
/* The only thing of note here is that it appears that the names in */
/* the rgszNames string are UNICODE strings. For convenience I'm */
/* using the NSString stringWithCharacters: method which handles */
/* Unicode strings. */
while(cNames--)
    {
    SEL selector;
    NSString* name = [NSString stringWithCharacters: rgszNames[cNames]
            length: wcslen(rgszNames[cNames])];
        //
        // Make "sendMsg" a special case-insensitive case.
        //
        if ([name caseInsensitiveCompare:@"sendMsg"]== NSOrderedSame)
            {
                rgdispid[cNames] = (DISPID)@selector(sendMsg);
                continue;
            }
        // "_NewEnum" and "value" are special cases which we need to
        // map case-insensitively because they don't nessecarily appear direcly
        // in program text, but are referenced from "OLE Engines" directly.
        //
        else if ([name caseInsensitiveCompare:@"_NewEnum"] == NSOrderedSame)
            {
                rgdispid[cNames] = DISPID_NEWENUM;
                continue;
            }
        //
        // Make "value" a special case-insensitive case.
        //
        else if ([name caseInsensitiveCompare:@"value"] == NSOrderedSame)
            {
                rgdispid[cNames] = DISPID_VALUE;
                continue;
            }
    /* We just get the string and make sure it's registered with the */
    /* runtime so that when we ask for the selector in the objc_invoke */
    /* function we get a valid selector back. */
    selector = sel_registerName(NXUniqueString ([name cString]));
    if(selector == 0)
            {
                /* Shouldn't fall into here since sel_registerName should */
                /* register a name if not already registered, but in case */
                /* we ever do, just return a resonable error for the */
                /* names that caused a failure. */
                rgdispid[cNames] = DISPID_UNKNOWN;
                returnValue = DISP_E_UNKNOWNNAME;
            }
    else
            {
                /* Otherwise, we take (safely) the address of the selector */
                /* returned to us and use that as the id! */
                rgdispid[cNames] = (DISPID)((char*)selector - (char*)0);
            }
    }
}
NS_ENDPOOL;
return returnValue;
}
NSValue*
convert_to_nsvalue( VARIANT* var)
{
switch( var->vt)
    {
    case VT_I2:
      return [NSNumber numberWithShort: var->iVal];
    case VT_I4:
      return [NSNumber numberWithLong: var->lVal];
    case VT_R4:
      return [NSNumber numberWithFloat: var->fltVal];
    case VT_R8:
      return [NSNumber numberWithDouble: var->dblVal];
    case VT_BOOL:
      return [NSNumber numberWithBool: var->bool];
    case VT_BSTR:
```

```
    {
      id object = [NSString stringWithCharacters:var->bstrVal length:wcslen(var->bstrVal)];
      return [NSValue value: (void*)&object withObjCType:"@"];
      break;
    }
    case VT_NULL:
    {
      break;
    }
    case VT_DISPATCH:
    case VT_UNKNOWN:
    {
      id oleProxy;
      if(oleProxy = [NSOLEBridge proxyForOLEObject: var->punkVal])
      {
        return [NSValue value: (void*)&oleProxy withObjCType:"@"];
      }
      break;
    }
    default:
      break;
  }
  return 0;
}
HRESULT
convert_for_return (NSValue *val, VARIANT *ret)
{
  wchar_t* wStrValue;
  switch (*[val objCType])
  case '@':
  case '#':
    id object;
    object = [val nonretainedObjectValue];
    if ([object isProxy] | ![object isKindOfClass:[NSString class]])
      {
        ret->pdispVal = (IDispatch*)[NSOLEBridge proxyForOBjCObject:object];
        ret->vt = VT_DISPATCH;
        return S_OK;
      }
    wStrValue = (wchar_t*)alloca (sizeof (wchar_t) * [object length] + sizeof(wchar_t));
    [object getWCString:wStrValue];
    ret->bstrVal = SysAllocString(wStrValue);
    ret->vt = VT_BSTR;
    return S_OK;
  }
case '*':
  {
    unsigned int length;
      char *stringValue;
      [val getValue: (void*)&stringValue];
      length = strlen(stringValue);
      wStrValue = (wchar_t*)alloca((length * sizeof(wchar_t)) + sizeof(wchar_t));
    MultiByteToWideChar(CP_ACP MB_PRECOMPOSED, stringValue, length + 1,
              wStrValue, length + 1);
    ret->bstrVal = SysAllocString(wStrValue);
    ret->vt = VT_BSTR;
    return S_OK;
  }
    case 's':
    case 'S':
      ret->vt = VT_I2;
      [val getValue:&ret->iVal];
      return S_OK;
    case 'i':
    case 'I':
    case 'l':
    case 'L':
      ret->vt = VT_I4;
      [val getValue:&ret->lVal];
      return S_OK;
    case 'f':
      ret->vt = VT_R4;
      [val getValue:&ret->fltVal];
      return S_OK;
    case 'd':
      ret->vt = VT_R8;
      [val getValue:&ret->dblVal];
      return S_OK;
    case 'c':
```

```
    case 'C':
    { char c;
      [val getValue:&c];
      ret->vt = VT_I2
         ret->iVal = c;
      return S_OK };
   default:
     return 0;
   }
 }
}
static ___stdcall HRESULT __RPC_FAR
_XX_COMNSObjectProxy_Invoke(COMNSObjectProxy *this,
                            DISPID dispidMember,
                            REFIID riid,
                            LCID lcid,
                            WORD wFlags,
                            DISPPARAMS *pdispparams,
                            VARIANT *pvarResult,
                            EXCEPINFO *pexcepinfo,
                            UINT *puArgErr)
{
  HRESULT returnValue = S_OK;
  char* buffer;
  SEL selector;
  NSMethodSignature *methodSignature = 0;
  NSString* realMessage;
  SEL realSelector;
  unsigned int numberOfIgnoredArgs = 0;
  BOOL isDistributedOLE = NO;
  realSelector = (SEL)dispidMember;
  if (dispidMember == DISPID_NEWENUM)
     debugPrint ([NSString stringWithFormat:@"{OLE->DO@0x%x}._NewEnum(. . .)]", this]);
  else if (dispidMember == DISPID_VALUE)
     debugPrint ([NSString stringwithFormat:@"{OLE->DO@0x%x}.Value(. . .)]", this]);
  else if (sel_isMapped (realSelector))
     debugPrint ([NSString stringWithFormat:@"{OLE->DO@0x%x}.%s(. . .)]", this, realSelector]);
  else
     debugPrint ([NSString stringWithFormat:@"{OLE->DO@0x%x}.ILLEGAL(. . .)]", this]);
  //
  // Get IEnumVARIANT when _NewEnum is called.
  //
  if (dispidMember == DISPID_NEWENUM
       && pvarResult != 0
       && (wFlags & (DISPATCH_PROPERTYGET|DISPATCH_METHOD)) != 0)
  {
     IEnumVARIANT *var = 0;
     //
     // Get hold of the NSEnumerator, and use AllocINSEnumVARIANT
     // from insenum.m to translate it into an IEnumVARIANT interface
     //
     NS_DURING
         if (AllocINSEnumVARIANT(this->target, &var) != S_OK)
             var = 0;
     NS_HANDLER
         var = 0;
     NS_ENDHANDLER;
     if (var == 0)
     {
      //
      // Weither there was an exception or not--make it simple
      // and say that we don't support enumerations.
      //
      return DISP_E_MEMBERNOTFOUND;
     }
     //
     // Return the new iteratior object
     //
     VariantInit (pvarResult);
     pvarResult->vt = VT_UNKNOWN;
     pvarResult->punkVal = (IUnknown*)var;
     returnS_OK;
  }
  if (dispidMember != DISPID_VALUE && !sel_isMapped (realSelector))
  {
       InitException (pexcepinfo, 1000, "NSOLEBridge Server",
                   "bad DISPID passed in (OLE error)");
       return DISP_E_EXCEPTION;
  }
  if (wFlags & DISPATCH_PROPERTYPUT)
```

-continued

```
    {
        if (pdispparams->cArgs != 1)
            return (DISP_E_BADPARAMCOUNT);
        if (methodSignature = [this->target
methodSignatureForSelector:@selector(setOLEPropertyNamed:to:)])
        {
            NSValue* val;
            val = convert_to_nsvalue( &(pdispparams->rgvarg[0]) );
            if (dispidMember == DISPID_VALUE)
              [this->target setOLEPropertyNamed:@"Value" to:val];
            else
              [this->target setOLEPropertyNamed: [NSString stringWithCString:sel_getName
(realSelector)]
              to: val];
            }
        else
            {
            InitException (pexcepinfo, 1000, "NSOLEBridge Server", "object does not support
setting properties");
            return DISP_E_EXCEPTION;
            }
    }
}
if ((wFlags & DISPATCH_PROPERTYGET) && (pdispparams->cArgs == 0))
    {
        if ( this->target
            && (DISPID)realSelector != DISPID_VALUE
            && (wFlags & DISPATCH_METHOD))
            {
            NS_DURING
              {
              methodSignature = [this->target methodSignatureForSelector: realSelector];
              }
            NS_HANDLER
              {
              /* we don't care if this fails */
              }
            NS_ENDHANDLER;
            }
        if (!methodSignature || (DISPID)realSelector == DISPID_VALUE)
            {
            NSValue *val;
        if (this->target == nil)
                {
                    pvarResult->vt = VT_BOOL;
                    pvarResult->bool = 0;
                    return S_OK;
                }
            else if (methodSignature = [this->target
methodSignatureForSelector:@selector(getOLEPropertyNamed:)])
                {
                    if (realSelector == DISPID_VALUE)
                        {
                        val = [this->target getOLEPropertyNamed:@"value"];
                        }
                    else
                        {
                        val = [this->target getOLEPropertyNamed: [NSString
stringWithCString:sel_getName (realSelector)]];
                        }
                    if (val)
                        {
                          return convert_for_return (val, pvarResult);
                        }
                    else
                        {
                          InitException (pexcepinfo, 1000, "NSOLEBridge Server", "failed to get
property");
                          return DISP_E_EXCEPTION;
                        }
                }
            else if ((DISPID)realSelector == DISPID_VALUE)
                {
                    if (this->target->isa == objc_getClass("NSMutableStringProxy"))
                {
                        wchar_t *wStrValue = (wchar_t*)alloca (sizeof (wchar_t) * [this-
>target length] + sizeof(wchar_t));
                        [this->target getwcString:wStrValue];
                        pvarResult->bstrVal = SysAllocString(wStrValue);
                        pvarResult->vt = VT_BSTR;
```

-continued

```
                return S_OK;
            }
            else
            {
                pvarResult->vt = VT_UNKNOWN;
                pvarResult->pdispVal = (IDispatch*)this;
                this->vtable->AddRef ((IDispatch*)this);
                return S_OK;
            }
        }
    }
    if ((wFlags & DISPATCH_METHOD) == 0)
    {
        InitException (pexcepinfo, 1000, "NSOLEBridge Server", "object does not support
properties");
        return DISP_E_EXCEPTION;
    }
}
/* Currently we're only handling method dispatch */
if(wFlags & DISPATCH_METHOD)
    {
        if( dispidMember == (DISPID)@selector(sendMsg))
        {
            char *buffer2;
            VARIANT *arg0;
            VARIANT sendMsgName;
            VariantInit (&sendMsgName);
            arg0 = &(pdispparams->rgvarg[pdispparams->cArgs-1]);
    if (arg0->vt != VT_BSTR)
            {
                VariantChangeType(&sendMsgName, arg0, 0, VT_BSTR);
    }
            else
            {
        VariantCopy (&sendMsgName, arg0);
        }
            /* get the real selector from the 1st parameter in pdispparams->rgvarg */
            realMessage = [NSString stringWithCharacters:sendMsgName.bstrVal length:
wcslen(sendMsgName.bstrVal)];
            VariantClear (&sendMsgName);
            buffer2 = malloc ([realMessage cStringLength]+2);
            [realMessage getCString:buffer2];
            selector = realSelector = sel_registerName (buffer2);
            if (realSelector != (SEL)buffer2)
                free (buffer2);
            numberOfIgnoredArgs = 1;
    }
  else
    {
        int cnt, size;
        size = strlen (sel_getName ((SEL)dispidMember)) + 4;
        for (cnt = pdispparams->cNamedArgs; cnt ;cnt--)
            {
                size += strlen (sel_GetName ((SEL)pdispparams-
>rgdispidNamedArgs[cnt-1])) + 2;
            }
      buffer = (char*)malloc(size);
      /* Get the selector name from the runtime. The selector would have */
      /* been returned as the DISPID in objc_getIDsOfNames above. */
      strcpy (buffer, sel_getName((SEL)(realSelector)));
      if (!numberofIgnoredArgs && (pdispparams->cArgs - numberofIgnoredArgs))
      {
        int cnt;
        /* We need to cons together the arguments for the selector */
        /* so that we can build the final selector that will be given */
        /* to the NSInvocation object below. */
        /* */
        /* NOTE: Visual Basic 3.0 doesn't support named arguments so the */
        /* only method you can call from there are ones such as foo::: which */
        /* don't specify names as parameter seperators. Visual Basic for */
        /* Applications (which is used in Excel) does support named arguments */
        /* so you could call a method like foo:bar:baz:. */
        for (cnt = (pdispparams->cArgs - numberOfIgnoredArgs); cnt ;cnt--)
            {
              if (cnt <= pdispparams->cNamedArgs)
              {
                const char *selName = sel_getName((SEL)((char*)0
                        + (pdispparams->rgdispidNamedArgs[cnt
1])));
```

-continued

```
                /* If this is a named argument, add the name to the buffer */
            if (isupper (selName[0]))
                {
                    char tmp[2] = { 0, 0 };
                    tmp[0] = tolower (selName[0]);
                    strcat (buffer, tmp);
                    strcat (buffer, selName+1);
                }
                else
                {
                    strcat (buffer, selName);
                }
            }
            /* then after every argument put a colon. */
            strcat (buffer, ":");
        }
    }
    /* Make sure the selector is registered with the runtime. */
        if (isupper (buffer[0]))
            buffer[0] = tolower (buffer[0]);
    selector = sel_registerName (buffer);
    if((char*)selector != buffer)
        free(buffer);
    }
    if(selector)
        {
            NS_DURING
            /* This may go across the wire, but that's OK. This is safe to */
            /* call in the old and new object world (NSObject vs Object) */
            if(methodSignature || (methodSignature = [this->target methodSignatureForSelector:
selector]))
                {
                    // we're on the road to success...
                }
            else if ([this->target methodSignatureForSelector:@selector(isNSIDispatchProxy)]
                    && [this->target isNSIDispatchProxy])
                {
                    char buffer[1024];
                    int cnt;
                    int off;
                    sprintf (buffer, "%c%d@0:4" , pvarResult? '@' : 'v', pdispparams->cArgs
* 4);
                    for (off = 8, cnt = pdispparams->cArgs; cnt>0; cnt--, off += 4)
                    {
                        VARIANTARG *arg = &pdispparams->rgvarg[cnt-1];
                        char *form = 0;
                        switch (arg->vt & VT_BYREF)
                        {
                            case VT_UI1: form = "C"; break,
                            case VT_I2: form = "s"; break;
                            case VT_I4: form = "i"; break;
                            case VT_R4: form = "f"; break;
                            case VT_R8: form = "d"; break;
                            case VT_BSTR: form = "*"; break;
                            case VT_UNKNOWN: form = "@"; break;
                            case VT_DISPATCH: form = "@"; break;
                            case VT_BOOL: form = "c"; break;
                            case VT_NULL: form = "@"; break;
                            default:
                                *puArgErr = cnt;
                                NS_VALRETURN
(DISP_E_TYPEMISMATCH);
                        }
                        {
                            char buf2[10];
                            sprintf (buf2, "%s%d",form, off);
                            strcat (buffer, buf2);
                        }
                    }
                    methodSignature = [NSMethodSignature signatureWithObjCTypes:
buffer];
                    if (methodSignature == nil)
                {
                    [NSException raise: NSInternalInconsistencyException
                                format: @"Failed to send OLE message %s",
sel_getName (selector)];
                }
                    isDistributedOLE = YES;
                }
```

-continued

```
      else
      {
        NSString *desc = [this->target description];
        [NSException raise: NSDestinationInvalidException
              format: @"Class %@ does not respond to the method named: %s",
          desc, (char*)selector];
        /* not reached */
        NS_VALRETURN (DISP_E_EXCEPTION);
      }
      NS_HANDLER
        NSString *name;
      if(localException)
        name = [localException reason];
      else
        name = [NSString stringWithFormat:
              @"Objective C unhandled exception occured - %s", (char*)selector];
      InitException(pexcepinfo, _localHandler._code, "NSOLEBridge Server", [name
cString]);
      return (DISP_E_EXCEPTION);
      NS_ENDHANDLER
    }
  else
    {
      /* Should return an exception and point the pexcepinfo at the method name */
      NSString *name = [NSString stringWithFormat: @"The method %s could not be found.",
(char*)selector];
      InitException (pexcepinfo, 1000, "NSOLEBridge Server", [name cString]);
      return (DISP_E_EXCEPTION);
    }
  /* Everything should be cool now, go ahead and try to dispatch the method. */
    {
      NSInvocation* theInvocation = [NSInvocation invocationWithMethodSignature:
methodSignature];
      int nutmArgs = [methodSignature numberOfArguments] – 2; /* don't include self and
selector */
      int argCount;
      char* theString = NULL;
      if(numArgs != (pdispparams->cArgs - numberofIgnoredArgs))
        {
          /* If the argument counts don't agree, return the right error. */
          return (DISP_E_BADPARAMCOUNT);
        }
      for(argcount = 0; argCount < numArgs; argCount++)
        {
          HRESULT result;
          char * argType;
          VARIANTARG *arg = &pdispparams->rgvarg[numArgs-argCount–1 ];
          VARIANTARG outarg;
          VARTYPE newType;
          VARIANT newVariant;
          unsigned int error;
          /* Prepare the VARIANT struct using the OLE API functions */
          VariantInit(&newVariant);
          VariantInit(&outarg);
          /* Get the Argument info from the NSMethodSignature object. Don't */
          /* forget to add 2 to account for the self and selector parameters */
          /* the objc_msgSend puts on the stack. */
          argType = [methodSignature getArgumentTypeAtIndex: argCount + 2];
          /* Is this argument supposed to be an object? If it is then we */
          /* should do a different conversion. */
          newType = NSConvertToVARTYPE(arg, argType, &outarg);
          /* Convert the incoming VARIANT to a type that matches the argType. */
          /* Notice that this function counts arguments from right to left, so */
          /* that when you pass 0, you'll get the last parameter. */
      if (outarg.vt != newType)
          {
          result = VariantChangeType(&newVariant, &outarg, 0, newType);
      }
          else
          {
            result = S_OK;
      VariantCopy (&newVariant, &outarg);
          }
      /* Release outarg from the conversion above */
      VariantClear (&outarg);
          if(result != S_OK)
          {
            /* If there's an error, return something appropriate */
            switch(result)
```

-continued

```
            {
            case DISP_E_BADVARTYPE:
            case DISP_E_OVERFLOW:
            case DISP_E_TYPEMISMATCH:
              *puArgErr = argCount;
              return (DISP_E_TYPEMISMATCH);
            default:
              *puArgErr = argCount;
              InitException(pexcepinfo, 1000, "NSOLEBridge Server",
                     "Unable to convert parameter to usable type"); /* Should also
include type we're trying to convert to. */
            return (DISP_E_EXCEPTION);
            }
          }
          if(newVariant.vt & VT_BYREF)
          {
            InitException(pexcepinfo, 1000, "NSOLEBridge Server",
                   "NSOLEBridge Server doesn't handle VT_BYREF values"); /* Should
also include type we're trying to convert to. */
            return (DISPY_EXCEPTION);
          }
          /* This switch only has to handle C types. Any object types */
          /* would be handled above */
          switch(newVariant.vt)
          {
            case VT_UI1:
              [theInvocation setArgument:(void*)&newVariant.u.bVal atIndex:argCount+2];
              break;
            case VT_I2:
              [theInvocation setArgument:(void*)&newVariant.iVal atIndex:argCount+2];
              break;
            case VT_I4:
              [theInvocation setArgument:(void*)&newVariant.lVal atIndex:argCount+2];
              break;
            case VT_R4:
              [theInvocation setArgument:(void*)&newVariant.fltVal atIndex:argCount+2];
              break;
            caseVT_R8:
              [theInvocation setArgument: (void*)&newVariant.dblVal atIndex:argCount+2];
              break;
            case VT_BSTR:
              {
            // NSInvocation doesn't copy cString args, so we make an "autoreleased" cString
              unsigned int length = wcslen(newVariant.bstrVal);
              NSMutableData *data = [NSMutableData dataWithLength:length+1];
              char *theString = [data mutableBytes];
              theString = (char*)malloc(length + 1);
              WideCharToMultiByte(CP_ACP, 0, (LPCWSTR)(newVariant.bstrVal), length,
                       (LPSTR)theString, length, NULL, NULL);
              theString[length] = '\0';
              [theInvocation setArgument: (void*)&theString atIndex:argCount+2];
              break;
              }
            case VT_BOOL:
              {
              BOOL boolValue = (newVariant.bool != 0);
              [theInvocation setArgument: (void*)&boolValue atIndex:argCount+2];
              break;
              {
            case VT_NULL:
              }
              int nullValue = 0;
              [theInvocation setArgument: (void*)&nullValue atIndex:argCount+2];
              break;
              }
            case VT_DISPATCH:
            case VT_UNKNOWN:
              {
              id object = [NSOLEBridge proxyForOLEObject:(IUnknown*)
NewVariant.pdispVal];
              [theInvocation setArgument: (void*)&object atIndex:argCount+2];
              break;
              }
            default:
              *puArgErr = argCount;
              return (DISP_E_TYPEMISMATCH);
              break;
            }
          // release this argument...
```

-continued

```
            VariantClear (&newVariant);
        } /* For loop */
    NS_DURING
        {
           [theInvocation setSelector: selector];
           if (isDistributedOLE)
           {
                   NSValue *rVal = [this->target performInvocation:theInvocation
getReturn: [methodSignature methodReturnType]];
                   if (rVal)
                   {
                       if (convert_for_return (rVal, pvarResult) != S_OK)
                           {
                                   InitException (pexcepinfo, 1000, "NEXTORB",
"unable to convert return value");
                                   NS_VALRETURN (DISP_E_EXCEPTION);
                           }
                           else
                           {
                                   NS_VALRETURN (S_OK);
                           }
                   }
                   else
                   {
                       if (pvarResult)
                          pvarResult->vt = VT_EMPTY;
                       NS_VALRETURN (returnValue);
                   }
           }
           else
           {
           [theInvocation invokeWithTarget: this->target];
           }
        }
    NS_HANDLER
        {
        NSString *name = [NSString stringWithFormat:
                           @"Objective C unhandled exception during invocation of %s",
(char*)selector];
        InitException(pexcepinfo, 1000, "NSOLEBridge Server", [name cString]);
        return (DISP_E_EXCEPTION);
        }
    NS_ENDHANDLER
        /* Now get the return type back if it's requested */
        if(pvarResult)
        {
        pvarResult->vt = NSConvertToVARTYPE(NULL, [methodSignature
methodReturnType], 0);
        /* This switch only has to handle C types. Any object types */
        /* would be handled above */
        switch(pvarResult->vt)
            {
            case VT_UI1:
             {
              char byteValue;
                  [theInvocation getReturnValue: (void*)&byteValue];
                  pvarResult->iVal = byteValue;
                  break;
             }
            case VT_EMPTY:     /* this is returning void */
              break;
            case VT_I2:
              [theInvocation getReturnValue: (void*)&pvarResult->iVal];
              break;
            case VT_I4:
              [theInvocation getReturnValue: (void*)&pvarResult->lVal];
              break;
            case VT_R4:
             {
              float returnValue;
              [theInvocation getReturnValue: (void*)&returnValue];
              pvarResult->fltVal = returnValue;
              break;
             }
            case VT_R8:
              [theInvocation getReturnValue: (void*)&pvarResult->dblVal];
              break;
            case VT_BSTR:
             {
```

-continued

```
            char* strValue;
            wchar_t* wStrValue;
            unsigned int length;
            [theInvocation getReturnValue: (void*)&strValue];
            length = strlen(strValue);
            wStrValue = (wchar_t*)malloc((length * sizeof(wchar_t)) + sizeof(wchar_t));
            MultiByteToWideChar(CP_ACP, MB_PRECOMPOSED, strValue, length + 1,
                        wStrValue, length + 1);
            pvarResult->bstrVal = SysAllocString(wStrValue);
            free (wStrValue);
            break;
          }
          case VT_BOOL:
          {
            long boolValue;
            [theInvocation getReturnValue: (void*)&boolValue];
            pvarResult->bool = (VARIANT_BOOL)boolValue;
            break;
          }
          case VT_DISPATCH:
          {
            id object;
            [theInvocation getReturnValue: (id*)&object];
            pvarResult->pdispVal
                      = (IDispatch*) [NSOLEBridge proxyForOBJCObject:object];
              break;
          }
          default:
            InitException (pexcepinfo, 1000, "NSOLEBridge Server",
                      "unsupported return value");
            return (DISP_E_EXCEPTION);
          }
        }
      }
    }
  return returnValue;
}
static _stdcall HRESULT _RPC_FAR
COMNSObjectProxy_Invoke(COMNSObjectProxy *this,
              DISPID dispidMember,
              REFIID riid,
              LCID lcid,
              WORD wFlags,
              DISPPARAMS *pdispparams,
              VARIANT *pvarResult,
              EXCEPINFO *pexcepinfo,
              UINT *puArgErr)
              {
    HRESULT r;
    NS_POOL
    NS_DURING
    {
        r= _Xx_COMNSObjectProxyInvoke(this,
                          dispidMember,
                          riid,
                          lcid,
                          wFlags,
                          pdispparams,
                          pvarResult,
                          pexcepinfo,
                          puArgErr);
    }
    NS_HANDLER
    {
        NSString *why = [NSString stringWithFormat:@"(INTERNAL NEXTORB ERROR) Uncaught
Exception, %@", localException];
        InitException(pexcepinfo, 1001, "NEXTORB", [why cString]);
        r = DISP_E_EXCEPTION;
    }
    NS_ENDHANDLER;
    NS_ENDPOOL;
    return r;
}
VARTYPE
NSConvertToVARTYPE (VARIANTARG *arg, const char *type, VARIANTARG *outarg)
{
    int ptr = 0;
    /* skip modifiers... */
    while (*type == 'O' || *type == 'V' || *type == 'o' || *type == 'r') type++;
```

-continued

```
    if (arg && outarg)
      VariantCopy (outarg, arg);
    switch (*type)
    {
      case 'v':
        return VT_EMPTY | ptr;
        break;
      case 'c':
      case 'C':
        return VT_UI1 | ptr;
        break;
      case 's':
      case 'S':
        return VT_I2 | ptr;
        break;
      case 'i':
      case 'I':
      case 'l':
      case 'L':
        return VT_I4 | ptr;
        break;
      case 'q':
      case 'Q':
        return VT_NULL;
        break;
      case 'f':
        return VT_R4 ptr;
        break;
      case 'd':
        return VT_R8 ptr;
        break;
      case ':':
        return VT_NULL;
        break;
        case '#':
      case '@':
        if (arg)
        {
          int byref = 0;
          switch (arg->vt)
            case VT_BSTR:
            {
                OLECHAR OLECHAR *olestr = arg->bstrVal;
                id str = [NSString stringWithCharacters:olestr
                          length:wcslen(olestr)];
            VariantClear (outarg);
                outarg->pdispVal = (IDispatch*) [NSOLEBridge
proxyForOBJCObject:str];
                outarg->vt = VT_DISPATCH;
                return VT_DISPATCH;
            }
            case VT_DISPATCH:
            case VT_UNKNOWN:
            case VT_DISPATCH | VT_BYREF:
            case VT_UNKNOWN | VT_BYREF:
            return arg->vt & ~VT_BYREF;
            default:
            {
                VARIANT v;
                VariantInit (&v);
                if (VariantChangeType (&v, arg, 0, VT_BSTR) == S_OK)
                {
                    OLECHAR *olestr = v.bstrVal;
                    id str = [NSString stringWithCharacters:olestr
                              length:wcslen(olestr)];
                    VariantClear (&v);
                VariantClear (outarg);
                    outarg->pdispVal = (IDispatch*) [NSOLEBridge
proxyForOBJCObject:str];
                    outarg->vt = VT_DISPATCH;
                    return VT_DISPATCH;
                }
                else
                {
                return VT_NULL;
                }
            }
        }
      }
    }
```

```
            return VT_DISPATCH;
            break;
        case '{':
            return VT_NULL;
            break;
        case ' ':
            return VT_NULL;
            break;
        case '[':
            return VT_NULL;
            break;
        case '(':
            return VT_NULL;
            break;
        case 'b':
            return VT_NULL;
            break;
        case '*':
            return VT_BSTR ptr;
            break;
        default:
            abort ( );
        }
}
/* OLE2 IDispatch interface subclass which is a proxy */
/* for a real NSObject. */
static _stdcall _RPC_FAR HRESULT
COMNSObjectProxy_QueryInterface(COMNSObjectProxy _RPC_FAR *this,
                                REFIID riid,
                                void _RPC_FAR * _RPC_FAR * ppv)
{
 if (this == 0 || riid == 0 || ppv == 0)
                    return E_INVALIDARG;
                    if(IsEqualIID (riid, &IID_IUnknown)
                      || IsEqualIID (riid, &IID_IDispatch))
                      {
                      *ppv = this;
                      }
                    else
                      {
                        *ppv = NULL;
                        return ResultFromScode(E_NOINTERFACE);
                      }
                    this->vtable->AddRef((IDispatch*) this);
                     return NOERROR;
                    }
                    static _stdcall _RFC_FAR ULONG
                    COMNSObjectProxy_AddRef(COMNSObjectProxy *this)
                    {
                     if (this == 0)
        return 0;
  return ++this->m_refs;
}
static _stdcall _RPC_FAR ULONG COMNSObjectProxy#Release(COMNSObjectProxy
*this)
{
 if (this == 0)
    return 0;
  NS_POOL
  if(--this->m_refs == 0)
    {
      NS_DURING
      {
          this->m_refs += 10;
        [NSOLEBridge forgetProxy:this->target for: (IUnknown*)this];
          this->m_refs -= 10;
        [this->target release];
        free (this);
      }
      NS_HANDLER
      {
          debugPrint ([NSString stringWithFormat:@"Unhandled exception during release
of {OLE->DO@0x%x}", this]);
      }
      NS_ENDHANDLER;
      debugPrint ([NSString stringWithFormat:@"{OLE->DO@0x%x} free'd", this]);
      NS_POPPOOL;
    return 0;
  }
```

-continued

```
  NS_ENDPOOL;
  return this->m_refs;
}
static _stdcall _RPC_FAR HRESULT
COMNSObjectProxy_GetTypeInfoCount(COMNSObjectProxy *this, UINT *pctinfo)
{
 if (this == 0 || pctinfo == 0)
   return E_NOTIMPL;
 *pctinfo = 0;
 return S_OK;
}
static _stdcall _RPC_FAR HRESULT
COMNSObjectProxy_GetTypeInfo(COMNSObjectProxy *this,
                             UNT itinfo,
                             LCID lcid,
                             ITypeInfo **pptinfo)
{
 if (itinfo != 0)
   return DISP_E_BADINDEX;
 *pptinfo = NULL;
 return TYPE_E_ELEMENTNOTFOUND;
}
struct IDispatchVtbl COMNSObjectProxy_vtable = {
 &COMNSObjectProxy_QueryInterface,
 &COMNSObjectProxy_AddRef,
 &COMNSObjectProxy_Release,
 &COMNSObjectProxy_GetTypeInfoCount,
 &COMNSObjectProxy_GetTypeInfo,
 &COMNSObjectProxy_GetIDsOfNames,
 &COMNSObjectProxy_Invoke
};
COMNSObjectProxy *
alloc_COMNSObjectProxy(id anObject)
{
 COMNSObjectProxy* proxy;
 COMNSObjectProxy *o = malloc (sizeof (struct COMNSObjectProxy));
 o->vtable = &COMNSObjectProxy_vtable;
 o->m_refs = 1;
 o->target = [anObject retain];
 return o;
}
//
// We need methodSignatureForSelector
//
@interface NXProxy (NSMethodSignature)
@end
@implementation NXProxy(NSMethodSignature)
- methodSignatureForSelector:(SEL)op
{
 NXMethodSignature *sig = [self methodSignature:op fromZone:NXDefaultMallocZone( )];
 return [NSMethodSignature signatureWithObjCTypes: [sig methodReturnType]];
}
@end
@interface Object(NSMethodSignature)
@end
@implementation Object(NSMethodSignature)
- methodSignatureForSelector:(SEL)op
{
 NXMethodSignature *sig = [self methodSignature:op fromZone:NXDefaultMallocZone( )];
 return [NSMethodSignature signatureWithObjCTypes: [sig methodReturnType]];
}
@end
       NEXTSTEP/OPENSTEP to OLE
/* -*- mode:c-*- */
#import <windows.h>
#import <ole2.h>
#import <oleauto.h>
#undef alloca
#define alloca __builtin_alloca
#ifdef __GNUC__
#include <ole-header-fixes.h>
#endif /* __GNUC__ */
#import "NSIDispatch.h"
#import "NSOLEBndge.h"
#import <foundation/foundation.h>
#import <objc/protocol.h>
#import <remote/NXProxy.h>
#import <remote/NXMethodSignature.h>
#import "nxorb.h"
```

-continued

```
extern FILE* outputfd;
extern void debugPrint(const char* output);
static void
raise_disp_exception (id object, id methodName, SCODE err, EXCEPINFO* pexcep);
/*
 * An NSIUnknownProxy is a cover for an IUnknown OLE object.
 * The NSOLEBridge api should be used for accessing these.
 */
@implementation NSIUnknownProxy
- retain
{
 refcount += 1;
 return self;
}
- (unsigned int)retainCount
{
        return refcount;
}
- (void)release
{
 if (--refcount == 0)
   {
    [self dealloc];
   }
}
- (void)dealloc
{
 [NSOLEBridge _forgetProxy:self for:realObject];
 if (realObject)
   realObjec->lpVtbl->Release (realObject);
 [super dealloc];
}
- initWithOLEObject:(IUnknown*)punk
{
 refcount = 1;
 punk->lpVtbl->AddRef (punk);
 realObject = punk;
 return self;
}
@end
/*
 * An NSIDispatchProxy is a cover for an IDispatch OLE object.
 * The NSOLEBridge api should be used for accessing these.
 */
@implementation NSIDispatchProxy
// DO will ask this question so that it can send forwardInvocation:
// instead of building up a stack frame and calling objc_msgSend
// (which will trap in forward::and call methodSignatureForSelector:
// which we don't know how to answer)
// Its important that we don't get forwardInvocation: for the (DO sent) things
// (like isProxy) that we really do do.
- (BOOL)willForwardSelectro:(SEL)aSel {
 return ([self methodSignatureForSelector:aSel] == nil);
}
- (void) dealloc
{
 if (idTable)
   NSFreeMapTable (idTable);
 if (methodDescriptionTable)
   NSFreeMapTable (methodDescriptionTable);
 if (protocol)
[protocol free];
debugPrint ([NSString stringWithFormat:@"{DO->OLE@0x%x} free'd", self]);
[super dealloc];
}
- initWithOLEObject:(IUnknown*)punk
{
IDispatch *pdisp;
HRESULT result;
id retVal;
pdisp = (IDispatch*)punk;
methodDescriptionTable = 0;
protocol = 0;
idTable = NSCreateMapTable(NSNonOwnedPointerMapKeyCallBacks,
                    NSNonOwnedPointerMapValueCallBacks,
retVal = [super initWithOLEObject:(IUnknown*) pdisp];
debugPrint ([NSString stringWithFormat:@"{DO->OLE@0x%x} alloc'ed", self]);
return retVal;
}
```

-continued

```
- (DISPID) getDISPDForName:(NSString*)name
{
 DISPID theid = DISPID_UNKNOWN;
 SEL op = sel_registerName (NXUniqueString ([name cString]));
 if (theid = (DISPID)NSMapGet (idTable, op))
   {
    return theid;
   }
 else if (stricmp ([name cString], "value") == 0)
       {
               return DISPID_VALUE;
       }
         else
     {
     const char *stringValue = [name cString];
     int length = strlen(stringValue);
     OLECHAR *wStrValue = (OLECHAR*)alloca((length * sizeof(OLECHAR)) +
sizeof(OLECHAR));
     HRESULT res;
             OLECHAR *sysStr;
             UINT infocnt;
             struct ITypeInfo *info;
     MultiByteToWideChar(CP_ACP, MB_PRECOMPOSED, stringValue, length + 1,
                     wStrValue, length + 1);
     sysStr = SysAllocString(wStrValue);
     res = ((IDispatch*)realObject)->lpVtbl
             ->GetIDsOfNames ((IDispatch*) realObject, &IID_NULL, &sysStr,
                     1, LOCALE_SYSTEM_DEFAULT, &theid);
     if (res == S_OK && theid != DISPID_UNKNOWN)
         goto done;
         theid = DISPID_UNKNOWN;
         res = ((IDispatch*)realObject)->lpVtbl
             ->GetTypeInfoCount ((IDispatch*) realObject, &infocnt);
         if (res == S_OK && infocnt == 1)
         {
             res = ((IDispatch*)realObject)->lpVtbl
             ->GetTypeInfo ((IDispatch*) realObject, 0, LOCALE_SYSTEM_DEFAULT,
&info);
             if (res != S_OK)
                 goto done;
         res = info->lpVtbl->GetIDsOfNames (info, &sysStr, 1, &theid);
             info->lpVtbl->Release (info);
             goto done;
         }
     }
 }
done:
  if (theid != DISPID_UNKNOWN)
     NSMapInsert (idTable, op, (void*) theid);
  return theid;
}
extern VARTYPE
NSConvertToVARTYPE (VARIANTARG *arg, const char *type, VARIANTARG *outarg);
-(NSValue*)performInvocation:(bycopy NSInvocation*)inv getReturn:(char*)rettype
{
        typedef struct { id isa; NSObjCValue returnValue; } NSInv;
        NSInv *inv2 = inv;
        [self forwardInvocation:inv];
        if (rettype[0] != 'v')
            return [NSValue value:&inv2->returnValue.value withObjCType:rettype];
        else
            return nil;
}
- (void)forwardInvocation:(NSInvocation *)invocation
{
 IDispatch *target = (IDispatch*)realObject;
 DISPID dispidMember;
 NSString *selString;
 NSArray* funcName;
 int i, numArgs;
 DISPPARAMS params;
 selString = [NSString stringWithCString:sel_GetName ([invocation selector])];
 funcName = [selString componentsSeparatedByString: @"{DO->OLE@0x%x}.%@(...)",self,selString]);
 numArgs = [funcName count]-1;
 debugPrint ([NSString stringWithFormat:@"{DO->OLE@0x%x}.%@(...)", self, selString]);
 /* Set up the target selector */
 dispidMember = [self getDISPIDForName: [funcName objectAtIndex:0]];
 /* Set up the named arguments of PARAMS */
 {
  BOOL named = NO;
```

-continued

```
DISPID *names = alloca (numArgs * sizeof (DISPID));
params.cNamedArgs = 0;
params.rgdispidNamedArgs = 0;
for (i = 1; i < numArgs; i++)
  {
    NSString *str = [funcName objectAtIndex:i];
    if ([str cStringLength] > 0)
      {
        named = YES;
        params.cNamedArgs += 1;
        names[i-1] = [self getDISPIDForName:str];
      }
    else
      {
        if (named)
          {
            params.cNamedArgs += 1;
            names[i-1] = DISPID_UNKNOWN;
          }
      }
  }
/*
 * If there are any named arguments, reverse their order and
 * put them in the rgdispidNamedArgs element of PARAMS
 */
if (named)
  {
    int c;
    params.rgdispidNamedArgs
      = alloca (params.cNamedArgs * sizeof (DISPID));
    for (c = params.cNamedArgs; c > 0; c--)
      params.rgdispidNamedArgs[c] = names[params.cNamedArgs - c];
  }
}
/* Set up the real arguments */
if (numArgs == 0)
{
 params.cArgs = 0;
 params.rgvarg = 0;
}
else
{
int index;
NSMethodSignature *sig = [invocation methodSignature];
params.cArgs = numArgs;
params.rgvarg = alloca (numArgs * sizeof (VARIANTARG));
/ / initialize the arguments
{ int i; for (i = 0; i < params.cArgs; i++) VariantInit (&params.rgvarg[i]);}
/* INDEX is the argument index into the invocation, which has
 * two hidden arguments, thge selector and the receiver
 */
for (index = 2; index < 2+numArgs; index++)
  {
    /* Where to put this argument... */
    VARIANTARG* arg = &(params.rgvarg[numArgs-(index-2)-1]);
    char * infoType;
    const char *stringValue = 0;
    infoType = [sig getArgumentTypeAtIndex:index];
    switch (*infoType)
      {
      case '@':
      case '#':
        {
        id object;
        [invocation getArgument:&object atIndex:index];
         if ([object isKindOfClass:[NSString class]] == NO)
           {
             arg->pdispVal = (IDispatch*) [NSOLEBridge proxyForOBJCObject:object];
             arg->vt = VT_DISPATCH;
             continue;
           }
         stringValue = [object cString];
         /* FALL THROUGH */
        }
      case '*':
        {
         wchar_t* wStrValue;
         unsigned int length;
         if (!stringValue)
```

```
          {
          [invocation getArgument:&stringValue atIndex:index];
          }
        length = strlen(stringValue);
        wStrValue = (wchar_t*)alloca((length * sizeof(wchar_t))
                        + sizeof(wchar_t));
        MultiByteToWideChar(CP_ACP,
                    MB_PRECOMPOSED,
                    stringValue,
                    length + 1,
                    wStrValue,
                    length + 1);
        arg->bstrVal = SysAllocString(wStrValue);
        arg->vt = VT_BSTR;
        continue;
        }
      case 's':
      case 'S':
        arg->vt = VT_I2;
        [invocation getArgument:&arg->iVal atIndex:index];
        continue;
      case 'i':
      case 'I':
      case 'l':
      case 'L':
        arg->vt = VT_I4;
        [invocation getArgument:&arg->lVal atIndex:index];
        continue;
      case 'f':
        arg->vt = VT_R4;
        [invocation getArgument:&arg->fltVal atIndex:index];
        continue;
      case 'd':
        arg->vt = VT_R8;
        [invocation getArgument:&arg->dblVal atIndex:index];
        continue;
      default:
        [NSException raise:NSInvalidArgumentException
          format:@"%dth argument of %@", index, invocation];
        }
      ..
  }
  /* OK, here we go. Now we can dispatch the method. */
  {
  VARIANT returnVal;
  UINT argErr;
      EXCEPINFO excepInfo;
  HRESULT res;
  NSMethodSignature *sig = [invocation methodSignature];
  char *rettype = [sig methodReturnType];
  if (rettype[0] == 'v' || rettype[0] == 'O')
      {
      /* one-way or void */
      res = target->lpVtbl->Invoke (target,
                      dispidMember,
                      &IID_NULL,
                      LOCALE_SYSTEM_DEFAULT,
                      DISPATCH_METHOD,
                      &params,
                      0,
                      &excepInfo,
                      &argErr);
// Release ressources for the arguments
{ int i; for (i = 0; i < params.cArgs; i++) VariantClear (&params.rgvarg[i]);
      if (res != S_OK)
          raise_disp_exception (self, selString, res, &excepInfo);
      }
    /*
    * This is the case if a return value is expected.
    */
    else
      {
      VARIANT out, newVariant;
      VARTYPE newType;
      VariantInit (&returnval);
      /* expect return value */
      res = target->lpVtbl->Invoke (target,
                      dispidMember,
                      &IID_NULL,
```

-continued

```
                        LOCALE_SYSTEM_DEFAULT,
                        DISPATCH_METHOD | (numArgs == 0 ?
DISPATCH_PROPERTYGET:
                        &params,
                        &returnval,
                        &excepInfo,
                        &argErr);
    // Release ressources for the arguments
    { int i; for (i = 0; i < params.cArgs; i++) VariantClear (&params.rgvarg[i]);
    if (res != S_OK)
        raise_disp_exception (self, selString, res, &excepInfo);
        /* convert return type */
    VariantInit (&out);
        newType = NSConvertToVARTYPE(&returnVal, rettype, &out);
    VariantClear (&returnVal);
    VariantInit (&newVariant);
        if (out.vt != newType)
        {
         res = VariantChangeType(&newVariant, &out, 0, newType);
        }
        else
        {
          VariantCopy (&newVariant, &out);
        }
        VariantClear (&out);
        switch(newVariant.vt)
         {
        case VT_UI1:
         [invocation setReturnValue: (void*)&newVariant.u.bVal];
            break;
        case VT_I2:
         [invocation setReturnValue:(void*)&newVariant.iVal];
         break;
        case VT_I4:
         [invocation setReturnValue:(void*)&newVariant.lVal];
         break;
        case VT_R4:
         [invocation setReturnValue:(void*)&newVariant.fltVal];
         break;
        case VT_R8:
         [invocation setReturnValue: (void*)&newVariant.dblVal];
         break;
        case VT_BSTR:
           {
            unsigned int length wcslen(newVariant.bstrVal);
            char *theString = (char*)alloca(length + 1);
            WideCharToMultiByte(CP_ACP, 0, (LPCWSTR)(newVariant.bstrVal), length,
                    (LPSTR)theString, length, NULL, NULL);
            theString[length] = '\0';
            [invocation setReturnValue: (void*)&theString];
            break;
           }
        case VT_BOOL:
           {
            BOOL boolValue = (newVariant.bool != 0);
            [invocation setReturnValue: (void*)&boolValue];
            break;
           }
        case VT_NULL:
           {
            int nullValue = 0;
            [invocation setReturnValue: (void*)&nullValue];
            break;
           }
        case VT_DISPATCH:
        case VT_UNKNOWN:
           {
            id object = [NSOLEBridge proxyForOLEObject:(IUnknown*)newVariant.pdispVal];
            [invocation setReturnValue: (void*)&object];
            break;
           }
        default:
         [NSException raise:NSInValidArgumentException format:@"Unexpected return
type"];
        }
            VariantClear (&newVariant);
       }
    }
    return;
```

-continued

```
}
- (struct objc_method_description *)methodDescriptionForSelector:(SEL)sel
{
struct objc_method_description *desc = 0;
 if (methodDescriptionTable == 0)
   {
     methodDescriptionTable
        = NSCreateMapTable(NSNonOwnedPointerMapKeyCallBacks,
            NSNonOwnedPointerMapValueCallBacks,
            0);
   }
 if (desc = NSMapGet (methodDescriptionTable, sel))
   {
     /* hey, don't do anything... */;
   }
 else if (protocol && (desc = [protocol descriptionForInstanceMethod:sel]))
   {
     NSMapInsert (methodDescriptionTable, sel, desc);
   }
 else if (desc = [@protocol(NSIDispatchProxyProtocol)
            descriptionForInstanceMethod:sel])
   {
     /* hey, this should be reasonably fast so we won't cache it here... */
   }
 return desc;
}
- (struct objc_method_description *)descriptionForMethod:(SEL)sel
{
    struct objc_method_description * res;
      res = [self methodDescriptionForSelector: sel];
      return res;
}
- methodSignature:(SEL)sel fromZone:(NXZone *)zone
{
     NXMethodSignature* retValue;
     struct objc_method_description *method_desc = [self methodDescriptionForSelector:
sel];
     retValue = [NXMethodSignature fromDescription:method_desc fromZone:zone];
     return retValue;
}
// This is for NSDO support...
- (NSMethodSignature*) methodSignatureForSelector:(SEL)sel
{
 NSMethodSignature* sig;
 struct objc_method description *desc;
 if (desc = [self methodDescriptionForSelector: sel])
   sig = [NSMethodSignature signatureWithObjCTypes:desc->types];
 else
   sig = nil;
 return sig;
}
/* This method usually gets called from remote when an
 NXNSOLEProxy is send a message -setProtocolForProxy:... */
- (void) setProtocolForNSIDispatchProxy: (Protocol*)proto
{
 if (self->protocol) [self->protocol free];
 self->protocol = proto;
}
//
// NSIDispatchProxes are encoded as instances of NXNSOLEProxie's,
// when encoded for NXDO. NXNSOLEProxies forward setProtocolForProxy:
// using setProtocolForIDispatchProxy:
//
- encodeRemotelyFor:(NXConnection*)conn
 freeAfterEncoding:(BOOL*)flag
     isBycopy:(BOOL)isBycopy
{
 struct objc_object *proxy;
 proxy = [conn newLocal:self];
 proxy->isa = objc_getclass ("NXNSOLEProxy");
 return proxy;
}
- setProtocolForProxy:(Protocol*)proto
{
 if (self->protocol) [self->protocol free];
 self->protocol = proto;
 return self;
}
- (BOOL)respondsToSelector:(SEL)sel
```

-continued

```
{
 BOOL retVal;
 retVal = [self methodSignatureForSelector:sel] != nil;
 return retVal;
}
//
// The next couple of methods are required by Foundation 4.0's DO
//
- (Class)classForPortCoder
{
 return isa;
}
- (id)replacementObjectForPortCoder:(NSCoder *)aCoder
{
 return [NSDistantIDispatchProxy proxyWithLocal: self connection: [aCoder connection]];
}
- awakeAfterUsingCoder: (NSCoder*)aCoder
{
 return self;
}
//
// Set Property on an OLE Object
//
extern HRESULT
convert_for_return (NSValue *val, VARIANT *ret);
static void
raise_disp_exception (id object, id methodName, SCODE err, EXCEPINFO* pexcep)
{
      NSString *contextDesc = [NSString stringWithFormat:@"<OLE 0x%x>::%@",
                              object, methodName];
    switch (err)
      {
    case DISP_E_BADPARAMCOUNT:
        [NSException raise:NSInValidArgumentException
            format:@"%@: wrong number of arguments", contextDesc];
    case DISP_E_EXCEPTION:
        [NSException raise:NSGenericException
            format:@"%@: code=%d; src=%@; description=%@",
                contextDesc,
                    pexcep->wCode,
                    (pexcep->bstrSource ? [NSString
stringWithWCString:pexcep->bstrSource]:
                        [NSString stringWithCString: "Exception
source unknown"]),
                (pexcep->bstrDescription ? [NSString
stringWithWCstring:pexcep->bstrDescription]:
                        [NSString stringWithCString: "Unknown OLE Automation
exception"])];
    case DISP_E_MEMBERNOTFOUND:
        [NSException raise:NSIncalidArgumentException
            format:@"%@: attribute or selector not recognized", contextDesc];
    case DISP_E_NONAMEDARGS:
        [NSException raise:NSInvalidArgumentException
            format:@"%@: named arguments not supported", contextDesc];
    case DISP_E_OVERFLOW:
    case DISP_E_TYPEMISMATCH:
      [NSException raise:NSInvalidArgumentException
            format:@"%@: argument coersion failed", contextDesc];
    case DISP_E_PARAMNOTOPTIONAL:
        [NSException raise:NSInvalidArgumentException
            format:@"%@: named argument missing", contextDesc];
    case DISP_E_PARAMNOTFOUND:
        [NSException raise:NSInternalInconsistencyException
            format:@"%@: DISP_E_PARAMNOTFOUND", contextDesc];
    case DISP_E_BADVARTYPE:
        [NSException raise:NSInternalInconsistencyException
            format:@"%@: DISP_E_BADVARTYPE", contextDesc];
    case DISP_E_UNKNOWNINTERFACE:
        [NSException raise:NSInternalInconsistencyException
            format:@"%@: DISP_E_UNKNOWMNTERFACE", contextDesc];
    case DISP_E_UNKNOWNLCID:
        [NsException raise:NSInternalInconsistencyException
            format:@"%@: DISP_E_UNKNOWNLCID", contextDesc];
  }
}
- (void)setOLEpropertyNamed:(NSString*)name to:(NSValue*)val
{
 EXCEPINFO excepInfo;
 UINT argErr;
```

-continued

```
VARIANT arg;
HRESULT res;
DISPPARAMS params;
DISPID namedArg = DISPID_PROPERTYPUT;
IDispatch *target = (IDispatch*)realObject;
/* initialize the variant */
VariantInit (&arg);
convert_for_return (val, &arg);
params.cNamedArgs = 1;
params.rgdispidNamedArgs = &namedArg;
params.cArgs = 1;
params.rgvarg = &arg;
res = target->lpVtbl->Invoke (target,
                    [self getDlSPIDForName:name],
                        &IID_NULL,
                            LOCALE_SYSTEM_DEFAULT,
                    DISPATCH_PROPERTYPUT,
                    &params,
                    0,
                    &excepInfo,
                    &argErr);
// release variant ressources.
VariantClear (&arg);
if (res != S_OK)
{
  raise_disp_exception (self, name, res, &excepInfo);
}
}
//
// Get Property on an OLE Automation Object.
//
extern NSValue *convert_to_nsvalue (VARIANT*);
- (NSValue*)getOLEPropertyNamed:(NSString*)name
{
 DISPPARAMS params;
 EXCEPINFO excepinfo;
 DISPID theId;
 UINT argErr;
 VARIANT result;
 HRESULT res;
 IDispatch *target = (IDispatch*)realObject;
 NSValue *val;
 params.cArgs = 0;
 params.rgvarg = 0;
 params.cNamedArgs = 0;
 params.rgdispidNamedArgs = 0;
 /* initialize the return variant */
 VariantInit (&result);
 /* get the dispatch identifier */
 theId = [self getDISPIDForName:name];
 /* Perform the property get... */
 res = target->lpVtbl->Invoke (target,
                    theId,
                            &IID_NULL,
                                LOCALE_SYSTEM_DEFAULT,
                        DISPATCH_PROPERTYGET,
                        &params,
                        &result,
                        &excepInfo,
                        &argErr);
    if (res != S OK)
    {
      raise_disp_exception (self, name, res, &excepInfo);
    }
    // get the variant corresponding to the return value
    val = convert_to_nsvalue (&result);
    // release variant ressources.
    VariantClear (&result);
    return val;
}
- (NSString*)description
{
 NSString *result;
  NS_DURNG
  {
    NSValue *val = [self getOLEPropertyNamed:@"value"];
        if (val != nil
            && !stmcmp ([val objCType], @encode(id), 1)
            && [[val nonretainedObjectValue] isKindOfClass:[NSString class]])
```

-continued

```
            result = [[[val nonretainedObjectValue] retain] autorelease];
        else
            result = [NSString stringWithFormat:@"<OLE Automation Object 0x%x>", self];
    }
    NS_HANDLER
    {
        result = [NSString stringWithFormat:@"<OLE Automation Object 0x%x>", self];
    }
    NS_ENDHANDLER;
    {
    return result;
}
-(BOOL)isNSIDispatchProxy
{
        return YES;
}
@end
//
// This category contains the methods needed to distribute
// NSIDispatchProxy's over an NXConnection.
//
@interface NSIUnknownProxy (NXDOcompatibility) @end
@implementation NSIUnknownProxy (NXDOcompatibility)
// Required by NXReference stuff
- (BOOL)conformsTo:(Protocol*)p
{
    BOOL retVal;
    if ([p conformsTo:@protocol(NXReference)])
       retVal = YES;
    else
       retVal = NO;
    return retVal;
}
// called by NXConnection to maintain reference count
- addReference
{
    [self retain];
        return nil;
}
// called by NXConnection when the wirecount reaches zero
- free
{
        [self release];
        return nil;
}
// Usied by the NXProxystuff to get the wirecount
-(unsigned int)references
{
    unsigned int cnt;
        cnt = [self retainCount];
    return cnt;
}
// This is needed by the NXNSProxy stuff to decrement wirecount.
- (void)_decrementReferencesBy:(int)i
{
        while (i--) [self release];
}
//
// Even though we descend from NSProxy, we don't really want to be
// regarded as a proxy from Objective C's point of view.
//
- (BOOL)isNXNSProxy
{
        return NO;
}
- (BOOL)isProxy
{
        return YES;        // 4/30/96 BG
}
@end
```

Thus, a method and apparatus for dynamically brokering object messages among object models has been described.

What is claimed is:

1. A method of dynamically communicating an object message between a client and server of separate object models comprising:

establishing a plurality of proxy objects for a server, said plurality of proxy objects comprising a client proxy object, a server proxy object, and a server stub object;

sending a message from a client to said server and dynamically mapping said client to said server, said dynamic mapping comprising the steps of:

intercepting said message sent by said client in a first object model by said client proxy;

transmitting said message from said client proxy to said server proxy;

unpackaging said message by said server proxy;

forwarding said unpackaged message to said server stub;

querying said server in a second object model for interface information by said server stub;

generating a translated message using a message protocol of said server; and forwarding said translated message to said server.

2. The method of claim 1 further comprising transmitting a response from said server to said client.

3. The method of claim 1 further comprising:

said client sending a query to determine if said server is able to respond to said message; and responding affirmatively to said query regardless of whether said server is able to respond to said message.

4. The method of claim 1 wherein said establishing a plurality of proxy objects comprising:

said client establishing a connection to an Object Request Broker (ORB);

said client requesting from said ORB a connection to said server;

said ORB determining the existence of said server;

said ORB notifying said client if said server does not exist;

said ORB returning said client proxy object of said server to said client if said server exists, said returning client proxy object comprising:

creating a proxy object of said server, obtaining a stub object of said server, and creating mapping table information for said proxy object if said mapping table information does not already exist;

retrieving proxy object pointer for said server if mapping table information already exists for said server;

returning a copy of said proxy object of said server as a client proxy object to said client; and creating an association between said proxy object and said stub object.

5. The method of claim 4 further comprising creating an association between said client and said client proxy object.

6. The method of claim 4 further comprising creating an association between said server and said stub object.

7. The method of claim 4 further comprising creating an association between said server and said proxy object.

8. The method of claim 4 further comprising creating an association between said client and said stub object.

9. The method of claim 1 wherein said generating a translated message further comprises:

determining the expected number and type of arguments of said server;

determining whether an expected argument type is different than an argument type of said message; and translating one of said plurality of arguments to an expected argument type when its type is different than said expected argument type.

10. The method of claim 2 wherein said transmitting further comprises:

determining the expected type of said response;

determining whether said type of said response is different than said expected type;

translating said response from said type to said expected type when said type is different than said expected type;

generating a translated response using a message protocol of said client; and transmitting said translated response to said client.

11. An article of manufacture comprising:

a computer usable medium having computer readable program code embodied therein for dynamically handling an object message between a client and server in separate object models, said computer readable program code in said article of manufacture comprising:

computer readable program code configured to cause a computer to establish a plurality of proxy objects for a server, said plurality of proxy objects comprising a client proxy object, a server proxy object, and a server stub object;

computer readable program code configured to cause a computer to send a message from a client to said server;

computer readable program code configured to cause a computer to intercept said message sent by said client in a first object model, said intercept performed by said client proxy;

computer readable program code configured to cause a computer to transmit said message from said client proxy to said server proxy;

computer readable program code configured to cause a computer to unpackage said message by said server proxy;

computer readable program code configured to cause a computer to forward said unpackaged message to said server stub;

computer readable program code configured to cause a computer to query said server in a second object model for interface information for said server, said query performed by said server stub;

computer readable program code configured to cause a computer to generate a translated message using a message protocol of said server;

computer readable program code configured to cause a computer to forward said translated message to said server; and computer readable program code configured to cause a computer to transmit a response from said server to said client.

12. The article of manufacture of claim 11 further comprising:

computer readable program code configured to cause a computer to send a query to determine if said server is able to respond to said message; and computer readable program code configured to cause a computer to respond affirmatively to said query regardless of whether said server is able to respond to said message.

13. The article of manufacture of claim 11 wherein said program code configured to cause a computer to establish a plurality of proxy objects of said server further comprises:

computer readable program code configured to cause said client to establish a connection to an Object Request Broker (ORB);

computer readable program code configured to cause said client to request from said ORB a connection to said server;

computer readable program code configured to cause said ORB to determine the existence of said server;

computer readable program code configured to cause said ORB to notify said client if said server does not exist;

computer readable program code configured to cause said ORB to return said client proxy object of said server to said client if said server exists, said return client proxy object comprising:

creating a proxy object of said server, obtaining a stub object of said server, and creating mapping table information for said proxy object if said mapping table information does not already exist;

retrieving proxy object pointer for said server if mapping table information already exists for said server;

returning a copy of said proxy object of said server as a client proxy object to said client; and computer readable program code configured to cause a computer to create an association between said proxy object and said stub object.

14. The article of manufacture of claim 13 further comprising computer readable program code configured to cause a computer to create an association between said client and said proxy object.

15. The article of manufacture of claim 13 further comprising computer readable program code configured to cause a computer to create an association between said server and said stub object.

16. The article of manufacture of claim 13 further comprising computer readable program code configured to cause a computer to create an association between said server and said proxy object.

17. The article of manufacture of claim 13 further comprising computer readable program code configured to cause a computer to create an association between said client and said stub object.

18. The article of manufacture of claim 11 wherein said program code configured to cause a computer to generate a translated message further comprises:

computer readable program code configured to cause a computer to determine the expected number and type of arguments of said server;

computer readable program code configured to cause a computer to determine whether an expected argument type is different than an argument type of said message; and computer readable program code configured to cause a computer to translate one of said plurality of arguments to an expected argument type when its type is different than said expected argument type.

19. The article of manufacture of claim 11 wherein said program code configured to cause a computer to transmit said response further comprises the steps of:

computer readable program code configured to cause a computer to determine the expected type of said response;

computer readable program code configured to cause a computer to determine whether said type of said response is different than said expected type;

computer readable program code configured to cause a computer to translate said response from said type to said expected type when said type is different than said expected type;

computer readable program code configured to cause a computer to generate a translated response using a message protocol of said client; and computer readable program code configured to cause a computer to transmit said translated response to said client.

* * * * *